United States Patent
Odle et al.

(10) Patent No.: US 10,619,010 B2
(45) Date of Patent: Apr. 14, 2020

(54) POLYIMIDE AND POLYETHERIMIDE FROM METAL CONTAINING OLIGOMERS

(71) Applicant: SABIC GLOBAL TECHNOLOGIES B.V., Bergen op Zoom (NL)

(72) Inventors: Roy Ray Odle, Mt. Vernon, IN (US); Ke Cao, Blacksburg, VA (US); Guoliang Liu, Blacksburg, VA (US); Timothy Edward Long, Blacksburg, VA (US); Joseph Michael Dennis, San Jose, CA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/236,717

(22) Filed: Dec. 31, 2018

(65) Prior Publication Data

US 2019/0211153 A1    Jul. 11, 2019

Related U.S. Application Data

(63) Continuation-in-part of application No. PCT/US2017/068974, filed on Dec. 29, 2017.
(Continued)

(51) Int. Cl.
    *C08G 73/10* (2006.01)
    *C08L 79/08* (2006.01)

(52) U.S. Cl.
    CPC ........ *C08G 73/1071* (2013.01); *C08G 73/101* (2013.01); *C08G 73/1007* (2013.01);
    (Continued)

(58) Field of Classification Search
    CPC .... C08G 73/107; C08G 73/1003; C08G 8/02; C07C 37/66; C07G 1/02; C07D 401/00
    See application file for complete search history.

(56) References Cited

U.S. PATENT DOCUMENTS 4,433,131 A    2/1984  Bolon et al.
8,546,614 B1  10/2013  Tan et al.
(Continued)

FOREIGN PATENT DOCUMENTS

WO    2012133744 A1    10/2012

OTHER PUBLICATIONS

Written Opinion; International Application No. PCT/US2017/068974; International Filing Date—Dec. 29, 2017; dated Apr. 10, 2018. 11 pages.
(Continued)

Primary Examiner — Shane Fang
(74) Attorney, Agent, or Firm — Cantor Colburn LLP

(57) ABSTRACT

A polyimide oligomer of the formula

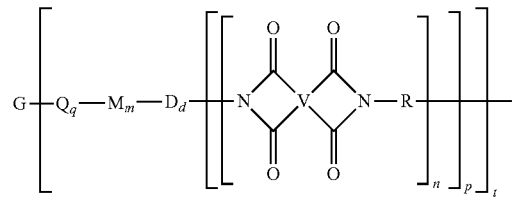

wherein G is a group having a valence of t, each R is independently a $C_{1-30}$ divalent bridging group, a $C_{1-20}$ alkylene-X, or a $C_{6-30}$ arylene-X wherein —X is —O-M', —C(O)O-M', —OC(O)O-M', —S-M', —S(O)$_2$-M', qj—S(O)$_3$-M', —OS(O)$_3$-M', or —OP(O)$_3$-M' wherein each M' is independently Li, Na, K, Cs, Mg, Ca, Sr, Cr, Mn, Fe, Co, Ni, Cu, Zn, Cd, B, Al, Ga, In, Ge, Sn, Pb, As, or Sb, provided that at least one R is $C_{1-20}$ alkylene-X or $C_{6-30}$ arylene-X, q is 0 or 1, m is 0 or 1, d is 0 or 1, p is 1 or 2, t is 1 to 6, and each n is independently 1 to 1,000, the total of all values of
(Continued)

n is greater than 4, the polyimide oligomer is thermoplastic, and Q, M, D, and V are as provided herein.

20 Claims, 4 Drawing Sheets

Related U.S. Application Data

(60) Provisional application No. 62/441,226, filed on Dec. 31, 2016.

(52) U.S. Cl.
CPC .......... *C08G 73/1046* (2013.01); *C08L 79/08* (2013.01); *C08L 2205/025* (2013.01); *C08L 2205/03* (2013.01)

(56) References Cited

U.S. PATENT DOCUMENTS

| | | |
|---|---|---|
| 8,962,890 B1 | 2/2015 | Tan et al. |
| 9,309,367 B2 | 4/2016 | Xiao et al. |
| 2007/0299188 A1 | 12/2007 | Chan et al. |
| 2014/0094535 A1 | 4/2014 | Guggenheim et al. |

OTHER PUBLICATIONS

He et al., "Preparation of Novel, High Modulus, Swollen- or Jungle-Gym-Type Polyimide Gels End-Crosslinked with 1, 3, 5-Tris(4-aminophenyl) Benzene," Journal of Polymer Science: Part A: Polymer Chemistry, vol. 40, 2501-2512 (2002); XP055463207.

Shiina et al., "Preparation of Properties of Polyimide-Silica Hybrid Films With Conjugation of the Polyimide and Silica by a Sol-Gel Process Using 3-(triethoxysilyl)Propyl Succinic Anhydride," Reactive and Functional Polymers 71 (2011); pp. 85-94; XP055463245.

Zhang et al., "Synthesis and Properties of Branch Sulfonated Polymides for Membranes in Vanadium Redox Flow Battery Application" Electrochimica Acta, 210 (2016); pp. 308-320; XP029661286.

Matsuda et al., "Syntheses and Properties of Polyureas from Divalent Metal Salts of p-aminobenzoic Acid, Diamine, and Diisocyanate," Journal of Applied Science Part A: Polymer Chemistry, vol. 28, Issue 7, Jun. 1990; Abstract only.

Qiu et al., "Preparation and Characterization of Metal-Containing Bismaleimides from Divalent Metal Salts of p-aminobenzoic Acid," Journal of Applied Polymer Science, vol. 63, Issue 13, Mar. 28, 1997; 3 pages.

Qiu et al., "Synthesis and Characterization of Polyimides from Divalent Metal Salts of p-Aminobenzoic Acid," Journal of Applied Polymer Science, vol. 59, pp. 1437-1442; (1996).

Zeng et al., "Synthesis and Characterization of Polyimides from Metal-Containing (Ba, Sr, Pb, Zn) Diamines," Polymer, vol. 36, No. 19, pp. 3761-3765, (1995).

POLYIMIDE AND POLYETHERIMIDE FROM METAL CONTAINING OLIGOMERS

CROSS REFERENCE TO RELATED APPLICATION

This application is a continuation-in-part of International Application PCT/US2017/068974, filed on Dec. 29, 2017, which claims priority to U.S. Provisional Application Ser. No. 62/441,226, filed on Dec. 31, 2016, the contents of which are incorporated by reference herein in their entireties.

BACKGROUND

Polyimides (PIs), and in particular polyetherimides (PEIs), are amorphous, transparent, high performance polymers having a high glass transition temperature. Polyetherimides further have high strength, heat resistance, and modulus, and broad chemical resistance, and thus are widely used in applications as diverse as automotive, telecommunication, aerospace, electrical/electronics, transportation, and healthcare. Moreover, PEIs can be recycled, whereas some PIs are thermosets that cannot be recycled.

Accordingly, there remains a continuing need for thermoplastic polyimides and polyetherimides that have high thermal stability and superior mechanical properties.

SUMMARY

Provided is a polyimide oligomer of the formula

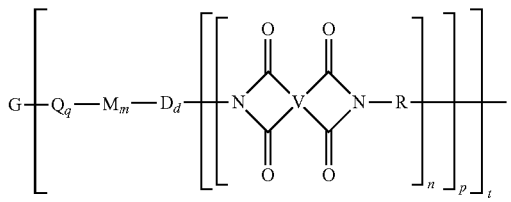

wherein G is a group having a valence of t, each Q is independently the same or different, and is a substituted or unsubstituted divalent $C_{1-60}$ hydrocarbon group, —O—, —C(O)O—, —OC(O)O—, —S—, —S(O$_3$)—, —OS(O)$_3$—, or —OP(O)$_3$—, each M is independently the same or different, and is a substituted or unsubstituted divalent $C_{1-60}$ hydrocarbon group, —O—, —C(O)—, —OC(O)—, —OC(O)O—, —NHC(O), —(O)CNH—, —S—, —S(O)—, or —S(O)$_2$—, D is a phenylene, each V is independently the same or different, and is a tetravalent $C_{4-40}$ hydrocarbon group, each R is independently the same or different, and is a $C_{1-30}$ divalent bridging group, a $C_{1-20}$ alkylene-X, or a $C_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein each M' is independently Li, Na, K, Cs, Mg, Ca, Sr, Cr, Mn, Fe, Co, Ni, Cu, Zn, Cd, B, Al, Ga, In, Ge, Sn, Pb, As, or Sb, provided that at least one R is $C_{1-20}$ alkylene-X or $C_{6-30}$ arylene-X, q is 0 or 1, m is 0 or 1, d is 0 or 1, p is 1 or 2, t is 1 to 6, and each n is independently the same or different, and is 1 to 1,000, provided that the total of all values of n is greater than 4, and wherein the polyimide oligomer is a thermoplastic.

Also provided is a method for the manufacture of the polyimide oligomer, comprising reacting a diamine of the formula $H_2N-R^1-NH_2$ with a dianhydride of the formula

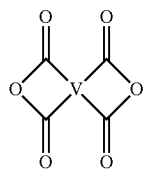

and optionally a polyamine of the formula

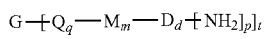

in a solvent and under conditions effective to provide an anhydride-capped oligomer; and reacting the anhydride-capped oligomer with a metalated amino compound of the formula $H_2N-R^2$ under conditions effective to provide the polyimide oligomer, wherein $R^1$ is a $C_{1-30}$ divalent bridging group, $R^2$ is a $C_{1-20}$ alkylene-X or a $C_{6-30}$ arylene-X.

Also provided is a method for the manufacture of a polyetherimide oligomer, comprising reacting a diamine of the formula $H_2N-R^1-NH_2$ with an anhydride of the formula

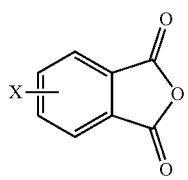

and optionally a polyamine of the formula

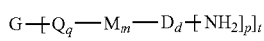

wherein X is a nitro group or halogen, to provide intermediate bis(phthalimide)s of the formulas

and optionally

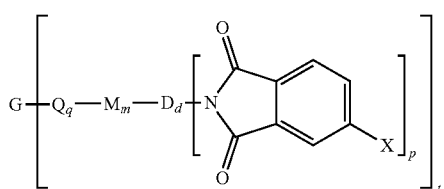

reacting the bis(phthalimide)s with an alkali metal salt of a dihydroxy aromatic compound of the formula AMO—Z—OAM wherein AM is an alkali metal, to provide an anhydride-capped oligomer; and reacting the anhydride-capped oligomer with a metalated amino compound of the formula $H_2N$—$R^2$ under conditions effective to provide the polyetherimide oligomer, wherein $R^1$ is a $C_{1-20}$ divalent hydrocarbon group, $R^2$ is a $C_{1-20}$ alkylene-X or a $C_{6-30}$ arylene-X.

Further provided are a polymer composition comprising the polyimide oligomer and a second polymer different from the polyimide oligomer, and an article comprising the polyimide oligomer.

The above described and other features are exemplified by the following figures, detailed description, and examples.

BRIEF DESCRIPTION OF THE DRAWINGS

The following figures are exemplary.

DETAILED DESCRIPTION

Figure 1A:
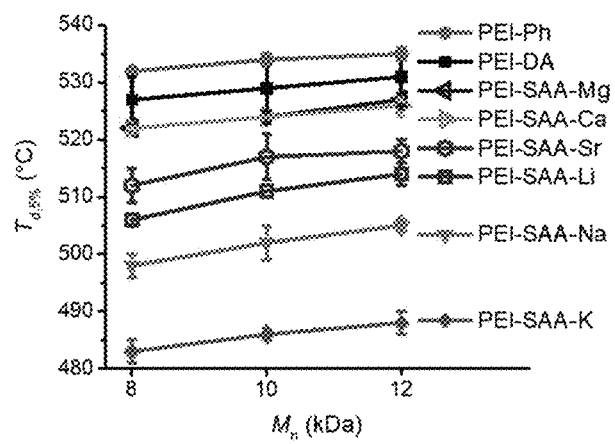
FIG. 1A is a graph of thermal decomposition temperature ($T_{d,5\%}$, ° C.) versus number average molecular weight ($M_n$, kilodaltons (kDa)).

PIs and PEIs having desirable physical properties often have high molecular weights and glass transition temperatures ($T_g$) that can necessitate the use of high temperatures to achieve practical flow rates for applications like injection molding. PIs and PEIs having a higher molecular weight can have better physical properties, but as molecular weight increases, so can $T_g$, and thus melt flow decreases. Thus, there is a continuing need for thermoplastic PIs and PEIs having certain desirable properties, including thermo-oxidative stability, melt stability, and rheology.

Provided herein are PIs and PEIs having terminal groups including metal cation-anion complexes that can be prepared by polymerizing a dianhydride, a diamine, and optionally a poly-functional aryl amine (polyamine), and subsequent endcapping of the intermediate product with a metalated amine. The resulting linear or branched oligomers have terminal end groups that include metal salts of oxides, carboxylates, carbonates, sulfides, sulfonates, phosphates, or the like. The synthesized PIs and PEIs terminated with metal salts exhibit excellent thermo-oxidative stability, melt stability, and rheological properties that can be tuned based on valency and size of the metal cations. The disclosed oligomers surprisingly resulted in a high Tg and good melt flow properties, which can provide a clear advantage over other thermoplastic PIs and PEIs that require lowering molecular weight, with concomitant loss of Tg and physical properties, in order to increase melt flow.

The thermoplastic polyimide oligomers are of formula (1)

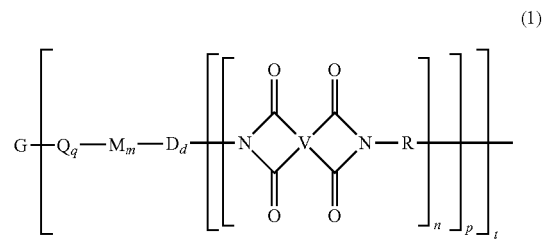

(1)

wherein G is a group having a valence of t, and q is 0 or 1, m is 0 or 1, d is 0 or 1, p is 1 or 2, t is 1 to 6. Each n is independently the same or different, and is 1 to 1,000, preferably 2 to 500, more preferably 3 to 100, provided that the total of all values of n is greater than 4, or greater than 10, or greater than 20, or greater than 50, or greater than 100, or greater than 250. For example, the total of all values of n can be 4 to 4,000, or 4 to 400, or 4 to 200, or 10 to 1,000, or 10 to 100, or 50 to 1,000, or 50 to 500.

Each Q is independently the same or different, and is a substituted or unsubstituted divalent $C_{1-60}$ hydrocarbon group, —O—, —C(O)O—, —OC(O)O—, —S—, —S(O_3)—, —OS(O)_3—, or —OP(O)_3—. For example, Q is —O—, —C(O)O—, —OC(O)O—, —S—, —S(O_3)—, —OS(O)_3—, or —OP(O)_3—. In a particular aspect, m is 0, t is 1 or 2, and Q is —C(O)O— or —S(O_3)—.

Each M is independently the same or different, and is a substituted or unsubstituted divalent $C_{1-60}$ hydrocarbon group, —O—, —C(O)—, —OC(O)—, —OC(O)O—, —NHC(O)—, —(O)CNH—, —S—, —S(O)—, or —S(O)_2—. For example, q is 1, Q is a $C_{6-20}$ arylene, m is 1, and M is —O—.

Each D is phenylene. For example, each D is the same or different phenylene, such as m-phenylene, p-phenylene, bis(4,4'-phenylene)sulfone, bis(3,4'-phenylene)sulfone, or bis(3,3'-phenylene)sulfone.

Each V is independently the same or different, and is a tetravalent $C_{4-40}$ hydrocarbon group. For example, V can be a $C_{6-20}$ aromatic hydrocarbon group. Exemplary aromatic hydrocarbon groups include any of those of formulas (2):

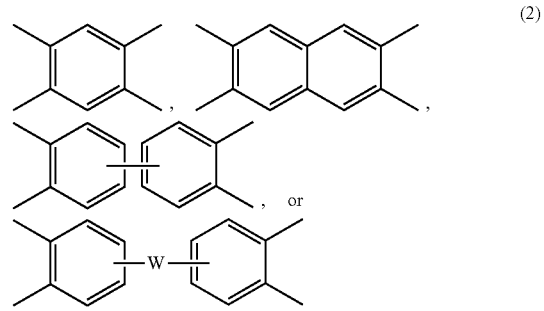

(2)

wherein W is —O—, —S—, —C(O)—, —SO_2—, —SO—, —P($R^a$)(=O)— wherein $R^a$ is a $C_{1-8}$ alkyl or $C_{6-12}$ aryl, —$C_yH_{2y}$— wherein y is an integer from 1 to 5 or a halogenated derivative thereof (which includes perfluoroalkylene groups), or a group of the formula —O—Z—O— as described in formula (1a) and (1a') below.

Each R is independently the same or different, and is a $C_{1-30}$ divalent bridging group, a $C_{1-20}$ alkylene-X, or a $C_{6-30}$ arylene-X wherein —X is —O-M', —C(O)O-M', —OC(O) O-M', —S-M', —S(O)_2-M', —S(O)_3-M', —OS(O)_3-M', or —OP(O)$_3$-M', and wherein each M' is independently Li, Na, K, Cs, Mg, Ca, Sr, Cr, Mn, Fe, Co, Ni, Cu, Zn, Cd, B, Al, Ga, In, Ge, Sn, Pb, As, or Sb, provided that at least one R is C$_{1-20}$ alkylene-X or C$_{6-30}$ arylene-X. For example, the C$_{1-30}$ divalent bridging group of R is the same or different C$_{6-20}$ organic bridging group or a halogenated derivative thereof, a straight or branched chain C$_{2-20}$ alkylene group or a halogenated derivative thereof, or a C$_{3-8}$ cycloalkylene group or halogenated derivative thereof, or in particular a divalent group of any of formulas (3):

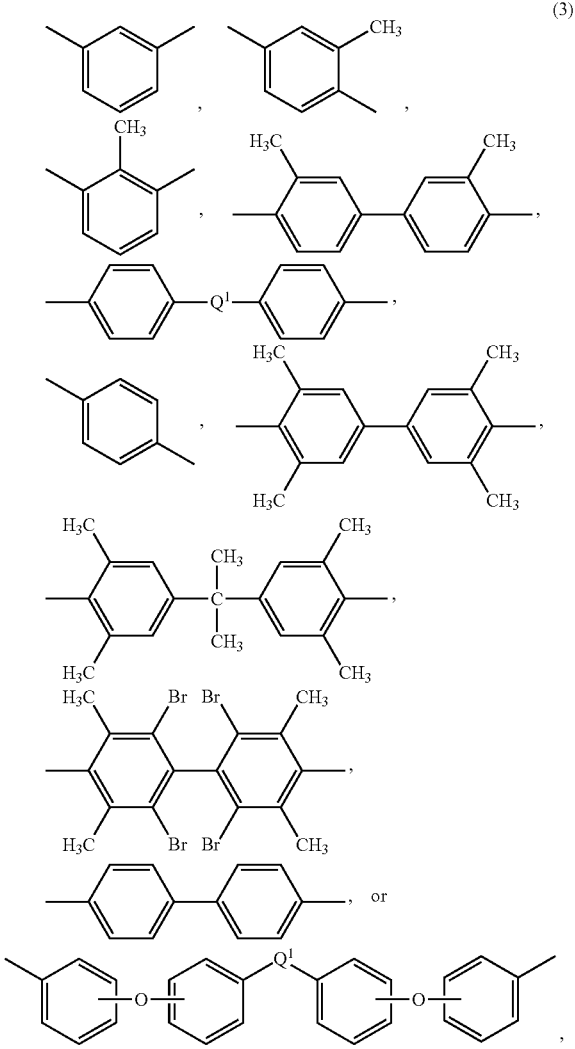
(3)

wherein Q$^1$ is —O—, —S—, —C(O)—, —SO$_2$—, —SO—, —P(R$^a$)(=O)— wherein R$^a$ is a C$_{1-8}$ alkyl or C$_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment R is m-phenylene, p-phenylene, or a diarylene sulfone.

G is a group of valence t and can be, for example, a cation such as Li, Na, K, Cs, Mg, Ca, Sr, Cr, Mn, Fe, Co, Ni, Cu, Zn, Cd, B, Al, Ga, In, Ge, Sn, Pb, As, Sb, Ti, or Zr. G can also be —O—, —C(O)—, —OC(O)—, —(O)CO—, —NHC(O), —(O)CNH—, —S—, —S(O)—, —S(O)$_2$—, —P(R$^a$)(O)— wherein R$^a$ is a C$_{1-8}$ alkyl or C$_{6-12}$ aryl, or a substituted or unsubstituted C$_{1-60}$ hydrocarbon group having a valence of t. In an aspect, t is 1, G is Li, Na, K, Li, Na, K, Mg, Ca, Sr, or Zn, Q is —O—, —C(O)O—, —OC(O)O—, —S—, —S(O$_3$)—, —OS(O)$_3$—, or —OP(O)$_3$—, and at least one R is a C$_{1-20}$ alkylene-X or a C$_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein each M' is independently Li, Na, K, Mg, Ca, Sr, or Zn. In another aspect, t is 2, G is Mg, Ca, Sr, or Zn, Q is —O—, —C(O)O—, —OC(O)O—, —S—, —S(O$_3$)—, —OS(O)$_3$—, or —OP(O)$_3$—, and at least one R is a C$_{1-20}$ alkylene-X or a C$_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein M' is Li, Na, K, Mg, Ca, Sr, or Zn. In still another aspect, t is 2, G is —O—, —C(O)—, —OC(O)—, —(O)CO—, —NHC(O), —(O)CNH—, —S—, —S(O)—, —S(O)$_2$—, or —P(R$^a$)(O)— wherein R$^a$ is a C$_{1-8}$ alkyl or C$_{6-12}$ aryl, and at least one R is a C$_{1-20}$ alkylene-X or a C$_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein M' is Li, Na, K, Mg, Ca, Sr, or Zn.

When t is greater than 2, G is Cr, Mn, Fe, Co, Ni, Cu, Zn, Cd, B, Al, Ga, In, Sn, Pb, As, Sb, Ti, Zr, Ge, Sn, or a substituted or unsubstituted C$_{1-60}$ hydrocarbon group having a valence of t, G is present in an amount of 0.01 to 20 mol %, preferably 0.5 to 10 mol %, more preferably 1 to 5 mol %, and at least one R is a C$_{1-20}$ alkylene-X or a C$_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein each M' is independently Li, Na, K, Mg, Ca, Sr, or Zn. Exemplary substituted or unsubstituted C$_{1-60}$ hydrocarbon groups include a substituted or unsubstituted C$_{1-20}$ alkylene, a substituted or unsubstituted C$_{3-8}$ cycloalkylene, a substituted or unsubstituted C$_{6-20}$ arylene, or a substituted or unsubstituted C$_{3-12}$ heteroarylene.

Thus, when t is greater than 2, G is a branching group that is present in an amount of 0.01 to 20 mol %, preferably 0.5 to 10 mol %, more preferably 1 to 5 mol %. In other words, the polyimide oligomer is derived from 0.01 to 20 mol %, or 0.5 to 10 mol %, or 1 to 5 mol % of a branching polyamine of formula (8) based on the total moles of amine precursors, wherein the polyamine is described in further detail herein. In other words, when G is a branching group, the polyimide can include from 0.01 to 20 mole percent (mol %), or 0.5 to 10 mol %, or 1 to 5 mol % of G end groups, based on the total moles of repeating units in the oligomer. More specifically, the polyimide can include from 0.01 to 20 mol % of diimide units containing G end groups, based on the total moles of repeating diimide units in the polyimide oligomer.

The cations described herein can optionally include one or more additional ligands that can be anionic or neutral, including but not limited to halide, hydroxide, carbonate, cyanide, nitrate, ammonia, water, a coordinating solvent (e.g., an ether or carbonyl), a C$_{1-6}$ alkoxide, a C$_{1-6}$ carboxylate, a C$_{1-6}$ alkylamine, or the like.

For example, m is 0, t is 2, Q is —C(O)O— or —S(O$_3$)—, and G is Mg, Ca, Sr, or Zn. In another example, m is 0, t is 2, Q is —C(O)O— or —S(O$_3$)—, G is Mg, Ca, Sr, or Zn, and at least one R is a C$_{1-20}$ alkylene-X or a C$_{6-30}$ arylene-X wherein —X is —C(O)O-M' or —S(O)$_3$-M', and wherein each M' is independently Li, Na, K, Mg, Ca, Sr, or Zn. In still another example, m is 0, t is 1, Q is —C(O)O— or —S(O$_3$)—, and at least one R is a C$_{1-20}$ alkylene-X or a C$_{6-30}$ arylene-X wherein —X is —C(O)O-M' or —S(O)$_3$-

M', and wherein each M' is independently Li, Na, K, Mg, Ca, Sr, or Zn. In a specific example, q is 1, Q is a $C_{6-20}$ arylene, m is 1, and M is —O—.

The polyimide oligomer can be a polyetherimide of formula (1a)

In formula (1a) each R is the same or different, and is m-phenylene or p-phenylene, bis(4,4'-phenylene)sulfone, bis(3,4'-phenylene)sulfone, bis(3,3'-phenylene)sulfone, a $C_{1-20}$ alkylene-X, or a $C_{6-30}$ arylene-X wherein —X is —O-M', —C(O)O-M', —OC(O)O-M', —S-M', —S(O)$_2$-M',

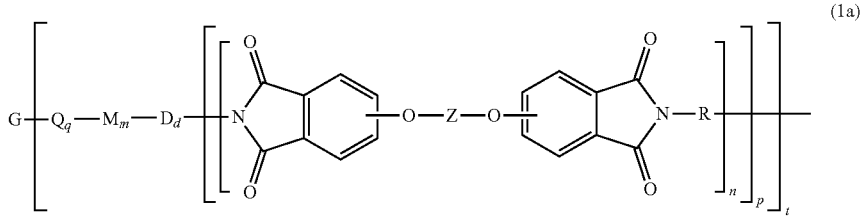

(1a)

wherein G, Q, M, D, R, q, m, d, n, p, and t are as defined in formula (1), and wherein the divalent bonds of the —O—Z—O— group are in the 3,3', 3,4', 4,3', or the 4,4' positions. The group Z in —O—Z—O— of formula (1a) is a divalent organic group, and can be an aromatic $C_{6-24}$ monocyclic or polycyclic moiety, optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of formula (5)

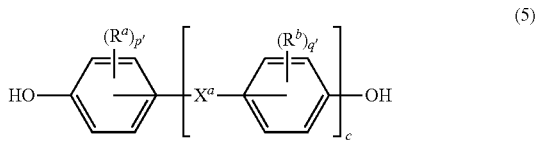

(5)

wherein $R^a$ and $R^b$ can each be the same or different and are a halogen atom or a monovalent $C_{1-8}$ alkyl group, for example; p' and q' are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (preferably para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as oxygen, nitrogen, sulfur, silicon, or phosphorous, and can be optionally substituted with 1 to 8 halogen atoms. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (5a)

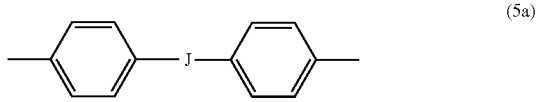

(5a)

wherein J is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is derived from bisphenol A, such that J in formula (5a) is 2,2-isopropylidene.

—S(O)$_3$-M', —OS(O)$_3$-M', or —OP(O)$_3$-M', wherein each M' is independently Li, Na, K, Mg, Ca, Sr, or Zn, and at least one R is $C_{1-20}$ alkylene-X or $C_{6-30}$ arylene-X. For example, R can be m-phenylene, p-phenylene, a $C_{1-20}$ alkylene-X, or a $C_{6-30}$ arylene-X, Z is of formula (5a), and J is 2,2-isopropylidene, and at least one R is phenylene-X wherein —X is —S(O)$_3$-M' and each M is independently Li, Na, K, Mg, Ca, Sr, or Zn.

The polyimide or polyetherimide can be a copolymer, for example a polyetherimide sulfone copolymer comprising structural units of formulas (1) or (1a) wherein at least 50 mol % of the R groups are of formula (3) wherein $Q^1$ is —SO$_2$—, and the remaining R groups are each independently p-phenylene, m-phenylene, $C_{1-20}$ alkylene-X, $C_{6-30}$ arylene-X, or a combination thereof; and Z is 2,2'-(4-phenylene)isopropylidene, provided that at least one R is $C_{1-20}$ alkylene-X or $C_{6-30}$ arylene-X. The polyetherimide copolymer can optionally comprise additional structural imide units, for example imide units wherein V of formulas

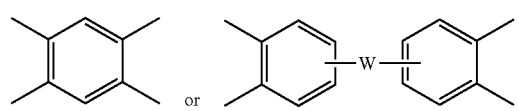

wherein W is a single bond, —O—, —S—, —C(O)—, —SO$_2$—, —SO—, —P($R^a$)(=O)— wherein $R^a$ is a $C_{1-8}$ alkyl or $C_{6-12}$ aryl, or —C$_y$H$_{2y}$— wherein y is an integer from 1 to 5 or a halogenated derivative thereof (which includes perfluoroalkylene groups). These additional structural imide units can comprise less than 20 mol % of the total number of units, or 0 to 10 mol % of the total number of units, or 0 to 5 mol % of the total number of units, or 0 to 2 mol % of the total number of units. In some embodiments, no additional imide units are present in the polyimides other than polyetherimide units.

The polyimide oligomers (which as indicated above include polyimide oligomer (1) and the polyetherimide oligomer (1a)), can be prepared by methods known in the art, including a polycondensation or ether-forming polymerization.

For example, the polyimide oligomer can be prepared by polycondensation, which includes an imidization of a dianhydride of formula (6) or formula (6a)

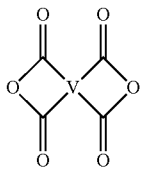
(6)

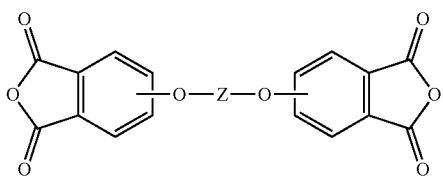
(6a)

or a chemical equivalent thereof, with a diamine of formula (7)

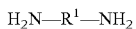
(7)

and optionally a branching polyamine of formula (8)

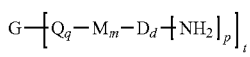
(8)

in a solvent and under conditions effective to provide an anhydride-capped oligomer; and reacting the anhydride-capped oligomer with a metalated amino compound of formula (9)

(9)

under conditions effective to provide the polyimide oligomer, wherein $R^1$ is a $C_{1-30}$ divalent bridging group, $R^2$ is a $C_{1-20}$ alkylene-X or a $C_{6-30}$ arylene-X wherein —X is as defined in formulas (1) and (1a). The optional branching polyamine (8) can be present in the reaction in an amount of 0.1 to 20 mol %, or 0.5 to 10 mol %, but preferably 1 to 5 mol %, or 1.5 to 4 mol % to achieve increased branching and increased PDI. Accordingly, when the polyamine (8) is used, G in the resulting polyimide oligomer is derived from the polyamine, and G is therefore present in the polyimide oligomer in an amount of 0.1 to 20 mol %, or 0.5 to 10 mol %, but preferably 1 to 5 mol %, or 1.5 to 4 mol %, based on the total moles of diamine (7) and polyamine (8).

Exemplary dianhydrides of formula (6) include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4-dicarboxyphenoxy)diphenyl sulfone dianhydride, or a combination thereof.

Specific examples of diamines of formula (7) include hexamethylenediamine, polymethylated 1,6-n-hexanediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylene-diamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylene diamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. Combinations of these compounds can also be used. For example, the diamine is m-phenylenediamine, p-phenylenediamine, 4,4'-diaminodiphenyl sulfone, or a combination thereof.

Exemplary polyamines (8) can include those of formulas (8a)-(8t).

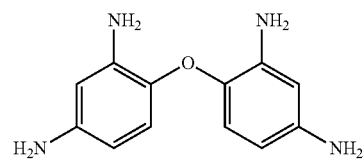
(8a)

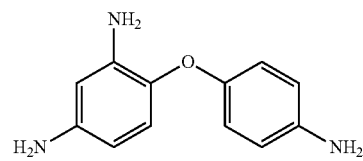
(8b)

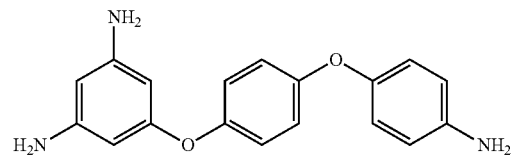
(8c)

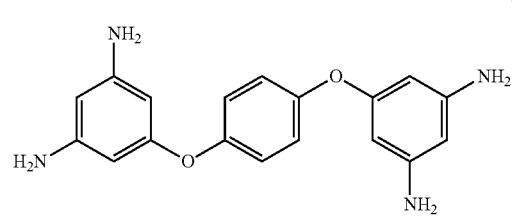
(8d)

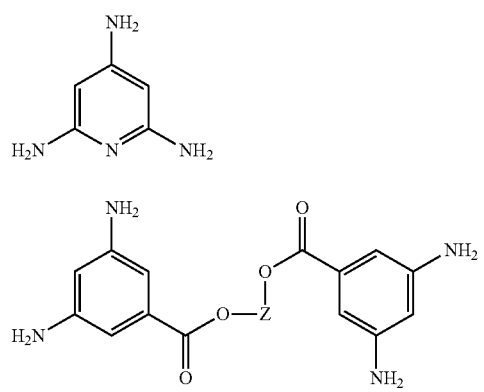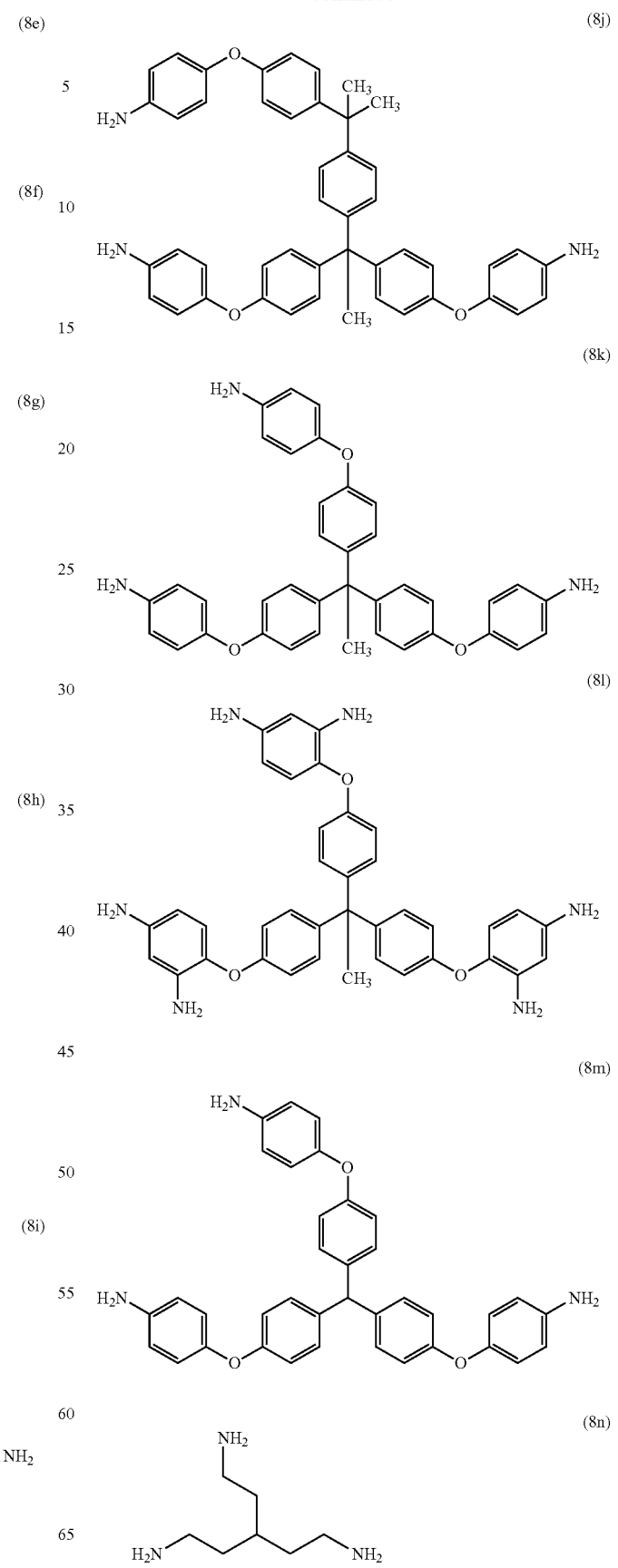

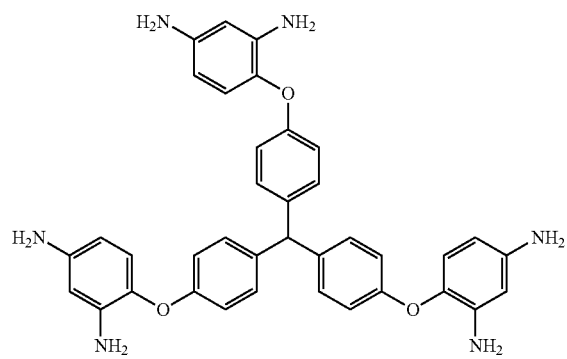
(8o)
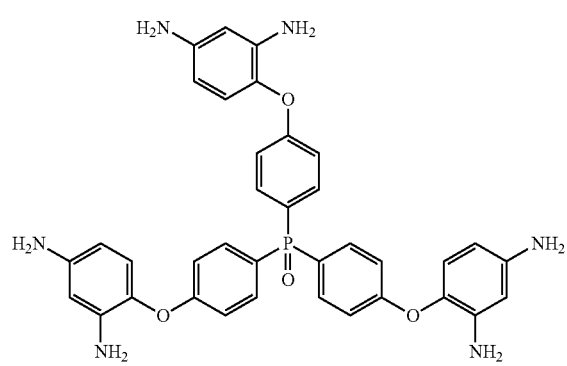
(8p)
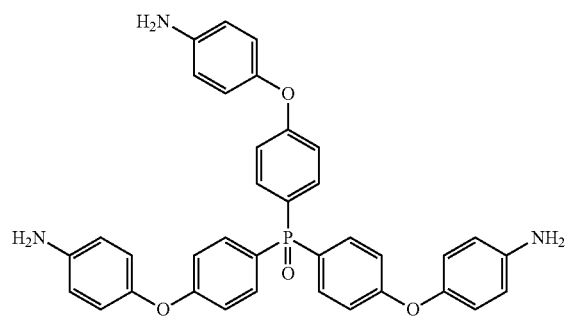
(8q)
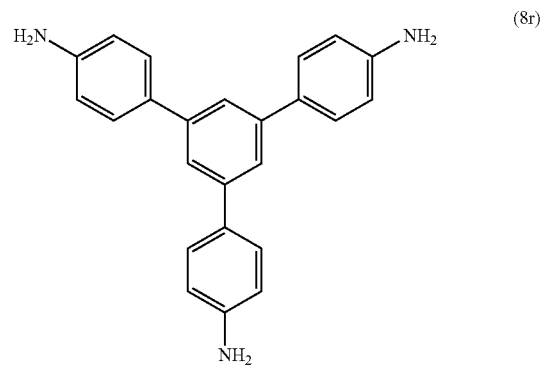
(8r)
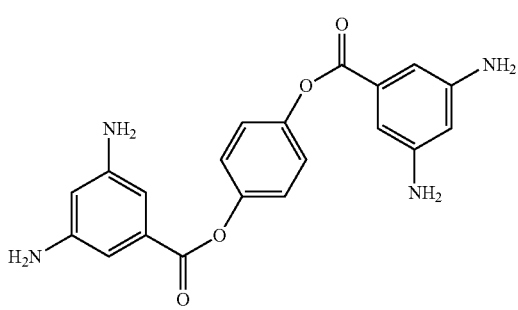
(8s)
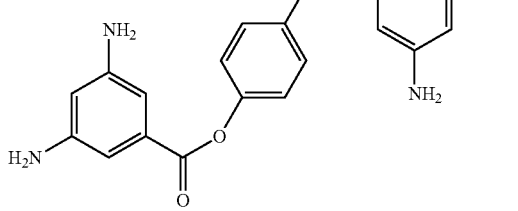
(8t)
In formula (8f), Z is a divalent $C_{1-60}$ hydrocarbon group, or a $C_{6-40}$ aromatic hydrocarbon group, a $C_{2-20}$ aliphatic group, or a $C_{4-8}$ cycloaliphatic group. Other exemplary branching amines are ionic polyamines, for example any of formula (8u) to (8z).
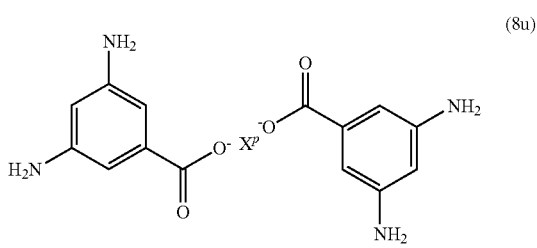
(8u)
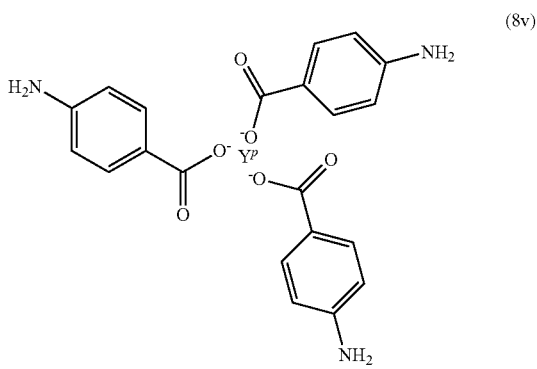
(8v)

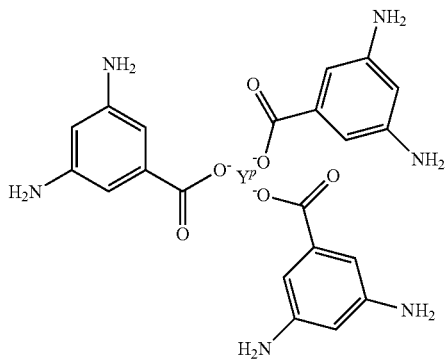

(8w)

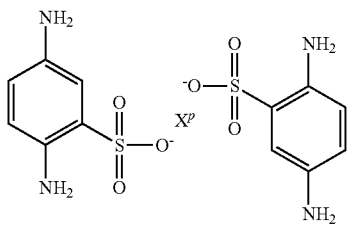

(8x)

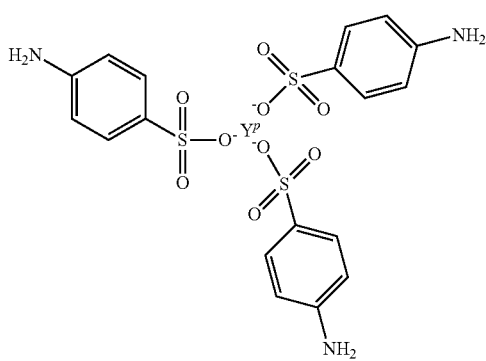

(8y)

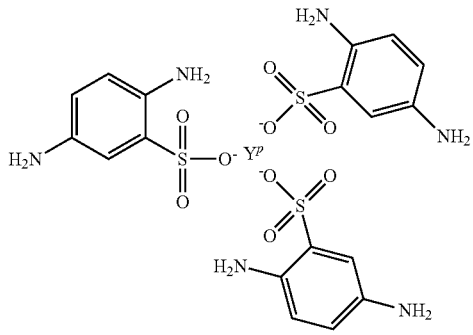

(8z)

wherein $X^p$ is Mg, Ca, Sr, Cr, Mn, Fe, Co, Ni, Cu, Zn, Cd, B, Al, Ga, In, Sn, Pb, As, or Sb, preferably Mg, Ca, Sr, or Zn; and $Y^p$ is Cr, Bi, Mn, Fe, Co, Ni, B, Al, Ga, In, Sn, Pb, As, or Sb. $X^p$ or $Y^p$ optionally include one or more additional ligands, including but not limited to halide, hydroxide, carbonate, cyanide, nitrate, ammonia, water, a coordinating solvent (e.g., an ether or carbonyl), a $C_{1-6}$ alkoxide, a $C_{1-6}$ carboxylate, a $C_{1-6}$ alkylamine, or the like. Thus, $X^p$ and $Y^p$ correspond to group G in the branching polyamine of formula (8).

Methods for the synthesis of the polyamines are known in the art. An exemplary method for the synthesis of the polyamine of formula (8) uses a two-step sequence. The first step is a nucleophilic aromatic substitution of a halogenated aromatic nitro compound (e.g., 1-chloro-4-nitrobenzene) with a polyphenol (e.g., 1,1,1-tris(4-hydroxyphenyl) ethane) that is converted to a polyphenoxide in-situ, providing a sufficiently nucleophilic oxygen to displace the activated halide. A polar aprotic solvent (e.g., dimethylacetamide) can promote the substitution reaction to afford a poly(nitrophenyl) compound (e.g., 1,1,1-tris((p-nitrophenoxy)phenyl) ethane). The second step is a reduction of the poly(nitrophenyl) compound to the polyamine of formula (8) using, for example, a palladium catalyst with a reducing agent, an iron-based catalyst, vasicine, zinc, samarium, and hydrazine.

A catalyst can be present during imidization. Exemplary catalysts include sodium aryl phosphinates, guanidinium salts, pyridinium salts, imidazolium salts, tetra($C_{7-24}$ arylalkylene) ammonium salts, dialkyl heterocycloaliphatic ammonium salts, bis-alkyl quaternary ammonium salts, ($C_{7-24}$ arylalkylene)($C_{1-16}$ alkyl) phosphonium salts, ($C_{6-24}$ aryl)($C_{1-16}$ alkyl) phosphonium salts, phosphazenium salts, and combinations thereof. The anionic component of the salt is not particularly limited, and can be, for example, chloride, bromide, iodide, sulfate, phosphate, acetate, maculate, tosylate, and the like. A combination of different anions can be used. A catalytically active amount of the catalyst can be determined by one of skill in the art without undue experimentation, and can be, for example, more than 0 to 5 mol % percent, or 0.01 to 2 mol %, or 0.1 to 1.5 mol %, or 0.2 to 1.0 mol % of the moles of amines.

Conditions effective to provide the polyimides and polyetherimides are generally known. Polymerization is generally carried out in a solvent, for example relatively non-polar solvents with a boiling point above 100° C., or above 150° C., for example o-dichlorobenzene, dichlorotoluene, 1,2,4-trichlorobenzene, dimethylacetamide, diphenyl sulfone, or a monoalkoxybenzene such as anisole, veratrole, diphenylether, N-methylpyrrolidone, or phenetole. The polymerization is generally at least 110° C., or 150 to 275° C., or 175 to 225° C. for solution polymerization. Atmospheric or super-atmospheric pressures can be used, for example up to 5 atmospheres, to facilitate the use of high temperatures without causing solvent to be lost by evaporation. Effective times depend on the particular reactants and reaction conditions, and can be 0.5 hours to 3 days, for example, for 0.5 to 72 hours, or 1 to 30 hours or 1 to 20 hours. Advantageously, the reaction is complete 20 hours or less, preferably 10 hours or less, more preferably 3 hours or less.

The metalated amino compound (9) can be added to the reaction mixture after a period of time, for example 1 to 24 hours, or 1 to 20 hours, or 1 to 18 hours, after the polymerization reaction begins. After addition of the metalated amino compound (9), the reaction mixture is subjected to continued heating, for example at 150 to 275° C., or 175 to 225° C., for an additional 1 to 10 hours, or 1 to 5 hours. In an embodiment, after the step of continued heating, the reaction mixture is subsequently heated at 200 to 450° C., or 300 to 400° C., for a period of 10 minutes to 2 hours, or 20 minutes to 90 minutes, or 30 minutes to 60 minutes. The metalated amino compound (9) can be added in any suitable amount, depending on the desired product. In an embodiment, the metalated amino compound (9) is 0 to 95 mol %, or 1 to 90 mol %, or 5 to 80 mol %, or 5 to 50 mol %, or 5 to 20 mol %, or 1 to 10 mol %, based on the total amount of dianhydride (6).

The molar ratio of dianhydride (6) to a combination of the optional polyamine (8) and organic diamine (7) can be 0.9:1 to 1.1:1, or 1:1. While other ratios can be used, a slight excess of dianhydride or diamine may be desirable. A proper stoichiometric balance between the dianhydride and combination of optional polyamine (8) and organic diamine (7) is maintained to allow for the production of the desired molecular weight of the polymer, or prevent the formation of polymer with significant amounts of amine end groups.

An endcapping agent, in addition to the metalated amino compound of formula (9), can be present during imidization, in particular a monofunctional compound that can react with an amine or anhydride. Exemplary compounds include monofunctional aromatic anhydrides such as phthalic anhydride, an aliphatic monoanhydride such as maleic anhydride, or monofunctional aldehydes, ketones, esters isocyanates, aromatic monoamines such as aniline, or $C_1$-$C_{18}$ linear or cyclic aliphatic monoamines. A monofunctional bisphthalimide can also be added before or during imidization. If an amine-containing endcapping agent is used, the amount can be more than 0 to 10 mol % based on the total amount of dianhydride. If an anhydride-containing endcapping agent is used, the amount can be in the range of more than 0 to 20 mol %, or 1 to 10 mol % based on the amount of the optional polyamine (8) and diamine (7) combined.

The polyimide oligomer can be a polyetherimide oligomer that is synthesized by an ether-forming polymerization, which proceeds via an imidization, i.e., reaction of a diamine of formula (7) with an anhydride of formula (10)

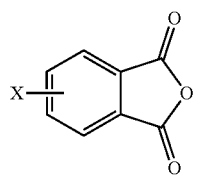
(10)

wherein X is a nitro group or halogen, and optionally the polyamine of formula (8), to provide intermediate bis(phthalimide)s of formulas (11a) and optionally (11b)

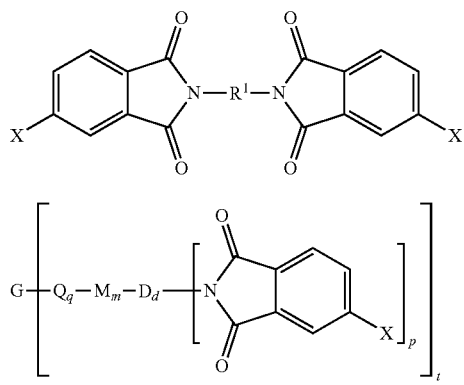

wherein G, Q, M, q, m, p, and t are as described in formula (1) and X is as described in formula (10). An optional catalyst or monofunctional chain terminating agent as described above can be present during imidization.

The bis(phthalimide)s (11a) and (11b) are reacted with an alkali metal salt of a dihydroxy aromatic compound of formula (12)

AMO—Z—OAM (12)

wherein AM is an alkali metal and Z is a group as defined herein, to provide the anhydride-capped oligomer; and the anhydride-capped oligomer is reacted with the metalated amino compound (9) under conditions effective to provide the polyetherimide oligomer. Polymerization conditions effective to provide the polyetherimides are generally known, and can be conducted in a solvent as described above. This polymerization can also be conducted in the melt, for example at 250 to 350° C., where a solvent is generally not present.

The polyimide oligomer can have a $T_g$ of greater than 160° C., preferably from 160 to 395° C., more preferably from 180 to 280° C., even more preferably from 200 to 250° C. In an example, the PEI-SAA-K and PEI-SAA-Sr oligomers with from 8 to 16 kDa can have a $T_g$ from 206 to 216° C., preferably 208 to 214° C., more preferably 208 to 212° C. In another example, the PEI-SAA-Li, PEI-SAA-Na, PEI-SAA-Mg, and PEI-SAA-Ca oligomers with from 8 to 16 kDa can have a $T_g$ from 210 to 220° C., preferably 212 to 220° C., more preferably 214 to 218° C.

The polyimide oligomers can have one or more of the following properties: a weight average molecular weight ($M_w$) of 1,000 to 150,000 g/mol, or 10,000 to 80,000 g/mol, or 20,000 to 60,000 g/mol, as determined by size exclusion chromatography (SEC) or proton nuclear magnetic resonance; a viscosity of greater than 25,000 Pascal·seconds at a frequency of 0.1 radians per second; a polydispersity of 1.5 to 3, preferably 1.5 to 2.4, more preferably 1.6 to 2.1, as determined by SEC; a melt index of 0.1 to 10 grams per minute (g/min), as measured by ASTM D1238 at 340 to 370° C., using a 6.7 kilogram (kg) weight; an intrinsic viscosity greater than 0.2 deciliters per gram (dL/g), preferably, 0.35 to 0.7 dL/g, as measured in m-cresol at 25° C.; a thermal decomposition temperature of greater than 450° C., preferably 480 to 600° C., more preferably 500 to 600° C., as determined at a 5% weight loss by thermogravimetric analysis (TGA).

Also provided is a polyimide composition comprising the polyimide oligomer as defined herein. The polyimide composition can have a tensile strength of greater than 70 megapascals (MPa), or 70 to 160 MPa, preferably 80 to 140 MPa, more preferably 90 to 130 MPa, as determined by ASTM D638. The polyimide composition can have an elongation at break of greater than 3%, or 3 to 6%, preferably 4 to 6%, more preferably 4.5 to 6%, as determined by ASTM D638. The polyimide composition can have an elastic modulus of 3 to 5 gigapascals (GPa), preferably 3.1 to 3.8 GPa, more preferably 3.2 to 3.6 GPa, as determined by ASTM D882.

The polyimide oligomer or polyimide composition can have a UL94 rating of V-1 or better, as measured following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. For example, the polyimide can have a UL94 rating of V-0 or V-1 at a thickness of 0.3, 0.5, 0.75, 0.9, 1, 1.5, 2, or 3 mm.

As described above, during the synthesis of the polyimide, the optional polyamine (8) and organic diamine (7), can be reacted in combination to achieve increased branching and increased PDI. Under these conditions, it is possible that both branched and unbranched polyimides are formed, to provide a polyimide composition comprising branched polyimides and a second polyimide that is not the same as the branched polyimide. This second polyimide is generally an unbranched polyimide that comprises more than 1, for example 5 to 1000, or 5 to 500, or 10 to 100, structural units of formula (14)

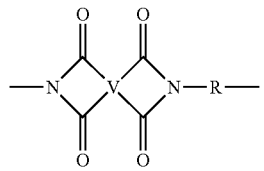

(14)

wherein V and R are as described in formula (1).

Also provided is a polymer composition comprising the polyimide and a second polymer that is not the same as the polyimide. Such polymer compositions can include 1 to 99 wt % of the polyimide or polyetherimide composition and 1 to 99 wt % of the second polymer, or 10 to 90% of the polyimide or polyetherimide composition and 10 to 90 wt % of the second polymer.

Illustrative examples of second polymers include polyacetal, poly($C_{1-6}$ alkyl)acrylate, polyacrylamide, polyacrylonitrile, polyamide, polyamideimide, polyanhydride, polyarylene ether, polyarylene ether ketone, polyarylene ketone, polyarylene sulfide, polyarylene sulfone, polybenzothiazole, polybenzoxazole, polybenzimidazole, polycarbonate, polyester, poly($C_{1-6}$ alkyl)methacrylate, polymethacrylamide, cyclic olefin polymer, polyolefin, polyoxadiazole, polyoxymethylene, polyphthalide, polysilazane, polysiloxane, polystyrene, polysulfide, polysulfonamide, polysulfonate, polythioester, polytriazine, polyurea, polyurethane, vinyl polymer, or a combination thereof.

The compositions can include various additives ordinarily incorporated into compositions of these types, with the proviso that any additive is selected so as to not significantly adversely affect the desired properties of the composition. Exemplary additives include antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame resistances, antidrip agents, and radiation stabilizers. Other useful additives include carbon nanotubes, exfoliated nanoclays, carbon nanowires, carbon nanospheres, carbon-metal nanospheres, carbon nanorods, carbon-metal nanorods, nanoparticles, or insoluble polymers. Combinations of additives can be used. The foregoing additives can be present individually in an amount from 0.005 to 10 wt %, or combined in an amount from 0.005 to 20 wt %, preferably 0.01 to 10 wt %, based on the total weight of the composition. Particulate fillers and reinforcing fillers can also be present.

Also provided herein is an article that includes the polyimide, polyimide composition, or polymer composition. A wide variety of articles can be manufactured, for example articles of utility in automotive, telecommunication, aerospace, electrical/electronics, battery manufacturing, wire coatings, transportation, food industry, and healthcare applications. Such articles can include films, membranes, fibers, foams, thin sheets, small parts, coatings, fibers, preforms, matrices for polymer composites, or the like. In a particular aspect, the article is an open or closed cell foam, preferably a closed cell foam. Another particular example is a separator for a lithium ion battery. The articles can be extruded or molded, for example by injection molding. The articles can be made by an additive manufacturing method, for example three dimensional printing. Components for electronic devices and components for sterilizable medical articles are especially useful. Thin-wall components manufactured by injection molding are useful, such as a wall having a thickness from 0.1 to 10 mm, or 0.2 to 5 mm, or 0.5 to 2 mm. For example, a film can be manufactured by solution-casting or melt processing the polyimide, the polyimide compositions, the polyetherimide compositions, and the polymer compositions described herein.

The disclosure further illustrated by the following non-limiting examples.

EXAMPLES

The components in Table 1 were used in the Examples.

TABLE 1

| Component | Description |
|---|---|
| mPD | m-Phenylenediamine (Sigma-Aldrich) |
| SAA-H | Sulfanilic acid, ≥99.0% (Sigma-Aldrich) |
| SAA-Na | Sodium sulfanilate hydrate (Sigma-Aldrich) |
| $LiCO_3$ | Lithium carbonate, ≥99.0% (Sigma-Aldrich) |
| $K_2CO_3$ | Potassium carbonate, ≥99.0% (Sigma-Aldrich) |
| MgO | Magnesium oxide, ≥99.0% (Sigma-Aldrich) |
| $CaCO_3$ | Calcium carbonate, ≥99.0% (Sigma-Aldrich) |
| $SrCO_3$ | Strontium carbonate, ≥99.0% (Sigma-Aldrich) |
| ZnO | Zinc oxide (Sigma-Aldrich) |
| BPADA | 2,2-Bis[4-(3,4-dicarboxyphenoxy) phenyl] propane dianhydride (SABIC) |

Proton nuclear magnetic resonance ($^1$H NMR) spectroscopy characterization was performed on a Varian Unity 400 at 399.98 MHz in $CDCl_3$ or DMSO-$d_6$.

Thermogravimetric analysis (TGA) was used to determine thermal degradation temperatures with a Discovery TGA 5500 (TA Instruments). The samples were heated to 600° C. at a heating rate of 10° C./min in a stream of nitrogen (25 mL/min).

Differential scanning calorimetry (DSC) was used to measure the glass transition temperatures ($T_g$) with a Discovery DSC 2500 (TA Instruments). The samples were heated at a rate of 10° C./min in a stream of nitrogen (25 mL/min). $T_g$ was determined at the midpoint of the transition in the second heating ramp. The polymers were hot-pressed between two Kapton sheets at 315° C. using two 0.254-mm-thick shims to control the film thickness. A mold releasing agent (provided by REXCO) was applied on the Kapton sheets to prevent the polymers from sticking. The polymer films were stepwise hot-pressed at a force of 1, 5, 7, 10, and 10 tons for one minute and released after each pressing (five pressing-releasing cycles in total).

Size exclusion chromatography-multiple angle light scattering (SEC-MALS) was used to characterize weight average molecular weight ($M_w$), number average molecular weight ($M_n$), and polydispersity (PDI) using an Eco-SECHLC-8320 instrument (Tosoh Bioscience) equipped with a Wyatt MiniDAWN TREOS MALS detector and a differential refractive index detector (DRI). Samples were dissolved in DMF, the mobile phase was 0.5 molar (M) LiBr in DMF, and the flow rate was 0.5 mL min$^{-1}$. The column set included a SuperH-H guard column (4.6 mm ID×3.5 cm, 4 μm), a SuperH-H guard column (6.0 mm ID×15 cm, 4 μm), and two SuperH-H guard columns (6.0 mm ID×15 cm, 4 μm). Both the detectors and columns were maintained at 50° C. Polystyrene standards were used as reference.

Melt rheological tests were performed on an AR-G2 rheometer (TA Instruments) with two 25-mm-diameter parallel plates. Dynamic time sweeps (1% oscillatory strain, 1 Hz, 1 h, under air) were used to evaluate changes in storage moduli (G'), the loss moduli (G"), and the complex viscosities of polymer melts at a constant temperature of 340° C. The storage modulus, loss modulus, and viscosity responses over a wide range of frequencies were recorded by stepwise frequency sweep tests in a temperature range of 250-340° C. (10° C./step, 1% oscillatory strain, 1-100 rad/s). The time-temperature superposition (TTS) master curves were generated at a reference temperature ($T_r$) of 300° C. using TRIOS (TA Instruments).

Scheme 1 illustrates the general procedure and reaction conditions for synthesizing the PEI-DA oligomers from BPADA and mPD with a stoichiometric imbalance.

round-bottom flask was equipped with an overhead stirring-rod, a Dean-Stark trap, and a nitrogen inlet. The flask was charged with BPADA (17.389 g, 33.409 mmol), mPD (3.335 g, 30.84 mmol), and oDCB (80 mL) and then purged with nitrogen. Subsequently, the slurry was heated at 180° C. for 12 hours (h) under constant stirring and then at 380° C. for 0.5 h without stirring in a metal bath. The entire reaction was conducted under a stream of nitrogen.

Example 2: Synthesis of SAA-Li

To a 100-mL two-neck round-bottom flask with a stirring bar, SAA-H (3.464 g, 20.00 mmol), $Li_2CO_3$ (0.977 g, 12.0 mmol), and deionized (DI) water (100 mL) were combined

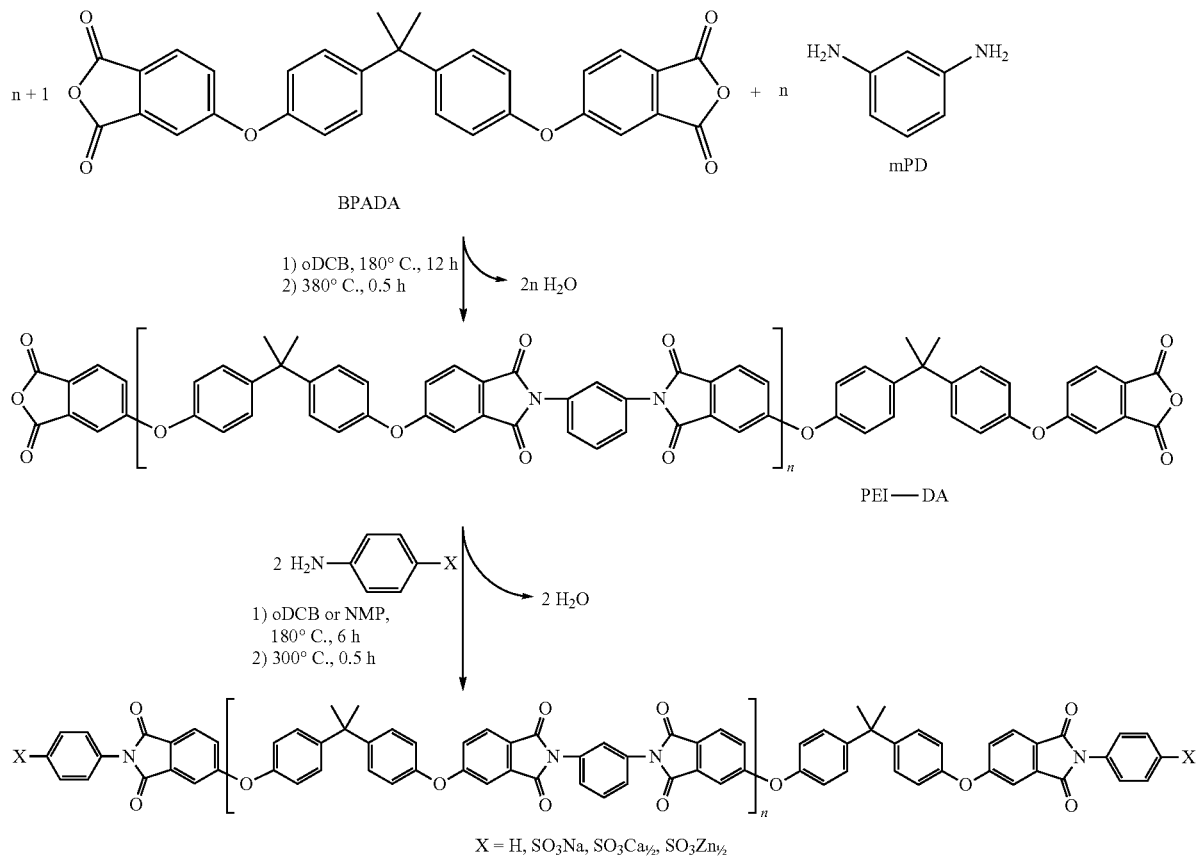

The first reaction step is the synthesis of a dianhydride-terminated PEI oligomer (PEI-DA). Subsequent reaction with a metalated sulfanilate salt or aniline provides the sulfonate-terminated PEI oligomers (PEI-SAA-M, M=Li, Na, K, Mg, Ca, Sr, or Zn, when X=$SO_3Li$, $SO_3Na$, $SO_3K$, $SO_3Mg_{1/2}$, $SO_3Ca_{1/2}$, $SO_3Sr_{1/2}$, or $SO_3Zn_{1/2}$, respectively) and phenyl-terminated PEI oligomer (PEI-Ph, when X=H), respectively.

Example 1: Synthesis of Dianhydride-Terminated PEI (PEI-DA)

A typical synthesis procedure for PEI-DA with a target number average molecular weight ($M_n$) of 8 kDa (8 k-PEI-DA, n=20) is described as follows. A 500-mL three-neck and heated at reflux for 1 hour. The reaction was conducted under a stream of nitrogen. The product was then filtered using a filtering paper and the filtrate was placed under vacuum to remove the water. A white powder was collected and dried in vacuo at 100° C. $^1$H NMR (400 MHz, DMSO-$d_6$, δ): 7.29-7.24 ppm (m, 2H, —$C_6H_4SO_2$—), 6.47-6.42 ppm (m, 2H, —$C_6H_4SO_2$—), 5.22 ppm (br s, 2H, —$NH_2$).

Example 3: Synthesis of SAA-Zn

To a 100-mL two-neck round-bottom flask with a stirring bar, SAA-H (3.464 g, 20.00 mmol), ZnO (0.977 g, 12.00 mmol), and DI water (100 mL) were combined and heated at reflux for 1 hour. The product was then filtered using a filtering paper and the filtrate was placed under vacuum to remove the water. A white powder was collected and dried in vacuo at 100° C. $^1$H NMR (400 MHz, DMSO-d$_6$, δ): 7.31-7.26 ppm (m, 2H, —C$_6$H$_4$SO$_2$—), 6.48-6.43 ppm (m, 2H, —C$_6$H$_4$SO$_2$—), 5.22 ppm (br s, 2H, —NH$_2$). SAA-Zn: $^1$H NMR (400 MHz, DMSO-d$_6$, δ): 7.27-7.22 ppm (m, 2H, —C$_6$H$_4$SO$_2$—), 6.46-6.41 ppm (m, 2H, —C$_6$H$_4$SO$_2$—), 5.17 ppm (br s, 2H, —NH$_2$).

Example 4: Synthesis of SAA-M (M=K, Mg, Ca, or Sr)

Additional metal sulfanilates were prepared according to the procedure of Example 2, except by reacting SAA-H with K$_2$CO$_3$, MgO, CaCO$_3$, or SrCO$_3$ to obtain the corresponding SAA-M (M=K, Mg, Ca, or Sr) products.

Example 5: Synthesis of PEI-SAA-Na

Sulfonate-terminated PEIs were prepared by reacting PEI-DA oligomers with SAA-M in NMP (Scheme 1). For example, the synthesis of the 8 k-PEI-SAA-Na oligomer is described as follows. To the flask containing the 8 k-PEI-DA oligomer as described above, SAA-Na (1.003 g, 5.139 mmol) and NMP (60 mL) were added. The mixture was heated at 180° C. for 6 h under constant stirring and then at 300° C. for 0.5 h without stirring in a metal bath. The entire reaction was conducted in a constant N$_2$ stream. The product was dissolved in DMF and precipitated into acetone. The precipitate was filtered, washed sequentially with DI water and acetone, and then dried in vacuo at 180° C. for at least 8 h.

Example 6: Synthesis of PEI-SAA-M (M=Li, K, Mg, Ca, Sr, and Zn)

Additional metalosulfonate-terminated PEI oligomers (M=Li, K, Mg, Ca, Sr, and Zn) were prepared by the same procedure using the appropriate SAA-M reactant.

Example 4: Synthesis of Phenyl-Terminated PEI Oligomer (PEI-Ph)

Similar to the PEI-SAA-M oligomers, the PEI-Ph oligomers were prepared by reacting the PEI-DA oligomer with aniline in oDCB (Scheme 1).

Characterization of PEI Oligomers

Table 2 shows the $M_n$, $M_w$, and PDI for PEI oligomers as prepared with a target $M_n$ of 8,000 kDa (8 k), 10,000 kDa (10 k), and 12,0000 kDa (12 k).

TABLE 2

| Sample | $M_n$ (kDa) | $M_w$ (kDa) | PDI |
| --- | --- | --- | --- |
| 8k-PEI-DA | 8.4 | 18.7 | 2.23 |
| 10k-PEI-DA | 9.7 | 22.7 | 2.34 |
| 12k-PEI-DA | 11.7 | 27.7 | 2.36 |
| 8k-PEI-Ph | 9.3 | 22.9 | 2.46 |
| 10k-PEI-Ph | 9.7 | 26.7 | 2.74 |
| 12k-PEI-Ph | 15.4 | 33.7 | 2.19 |
| 8k-PEI-SAA-Li | 11.5 | 20.5 | 1.79 |
| 10k-PEI-SAA-Li | 13.2 | 23.5 | 1.77 |
| 12k-PEI-SAA-Li | 15.7 | 31.1 | 1.98 |
| 8k-PEI-SAA-Na | 9.5 | 18.4 | 1.92 |
| 10k-PEI-SAA-Na | 13.8 | 26.6 | 1.93 |
| 12k-PEI-SAA-Na | 17.6 | 34.4 | 1.96 |
| 8k-PEI-SAA-K | 11.9 | 22.6 | 1.89 |
| 10k-PEI-SAA-K | 13.2 | 25.1 | 1.91 |
| 12k-PEI-SAA-K | 14.6 | 28.2 | 1.94 |
| 8k-PEI-SAA-Mg | 11.7 | 22.2 | 1.90 |
| 10k-PEI-SAA-Mg | 12.6 | 24.0 | 1.90 |
| 12k-PEI-SAA-Mg | 15.1 | 29.3 | 1.95 |
| 8k-PEI-SAA-Ca | 10.3 | 23.4 | 2.26 |
| 10k-PEI-SAA-Ca | 12.9 | 27.2 | 2.10 |
| 12k-PEI-SAA-Ca | 15.4 | 29.3 | 1.90 |
| 8k-PEI-SAA-Sr | 11.1 | 21.5 | 1.93 |
| 10k-PEI-SAA-Sr | 12.2 | 24.1 | 1.97 |
| 12k-PEI-SAA-Sr | 14.8 | 28.4 | 1.92 |
| 8k-PEI-SAA-Zn | 11.5 | 23.0 | 2.00 |
| 10k-PEI-SAA-Zn | 11.3 | 26.3 | 2.34 |
| 12k-PEI-SAA-Zn | 17.5 | 32.5 | 1.85 |

Thermal Analysis of PEI-Ph and PEI-SAA-M Oligomers

Tables 3 and 4 summarize the decomposition ($T_{d,5\%}$) and glass transition ($T_g$) temperatures for the 8 k-, 10 k-, and 12 k-PEI oligomers.

TABLE 3

| | PEI-DA | | PEI-Ph | | PEI-SAA-Li | | PEI-SAA-Na | | PEI-SAA-K | |
| --- | --- | --- | --- | --- | --- | --- | --- | --- | --- | --- |
| $M_n$ (kDa) | $T_{d,5\%}$ (° C.) | $T_g$ (° C.) | $T_{d,5\%}$ (° C.) | $T_g$ (° C.) | $T_{d,5\%}$ (° C.) | $T_g$ (° C.) | $T_{d,5\%}$ (° C.) | $T_g$ (° C.) | $T_{d,5\%}$ (° C.) | $T_g$ (° C.) |
| 8 | 527 | 209 | 532 | 205 | 506 | 214 | 498 | 213 | 483 | 211 |
| 10 | 529 | 211 | 534 | 210 | 511 | 216 | 502 | 216 | 486 | 212 |
| 12 | 531 | 214 | 535 | 214 | 512 | 218 | 505 | 218 | 488 | 213 |

TABLE 4

| | PEI-DA | | PEI-Ph | | PEI-SAA-Mg | | PEI-SAA-Ca | | PEI-SAA-Sr | | PEI-SAA-Zn | |
| --- | --- | --- | --- | --- | --- | --- | --- | --- | --- | --- | --- | --- |
| $M_n$ (kDa) | $T_{d,5\%}$ (° C.) | $T_g$ (° C.) | $T_{d,5\%}$ (° C.) | $T_g$ (° C.) | $T_{d,5\%}$ (° C.) | $T_g$ (° C.) | $T_{d,5\%}$ (° C.) | $T_g$ (° C.) | $T_{d,5\%}$ (° C.) | $T_g$ (° C.) | $T_{d,5\%}$ (° C.) | $T_g$ (° C.) |
| 8 | 527 | 209 | 532 | 205 | 522 | 215 | 522 | 214 | 512 | 211 | 497 | 221 |
| 10 | 529 | 211 | 534 | 210 | 524 | 216 | 524 | 216 | 517 | 212 | 502 | 221 |
| 12 | 531 | 214 | 535 | 214 | 527 | 217 | 526 | 217 | 518 | 213 | 505 | 221 |

Figure 1B:
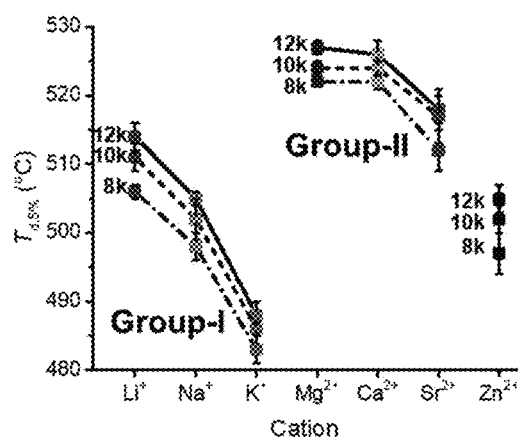
FIG. 1B shows the $T_{d,5\%}$ (° C.) as function of cation and $M_n$.

As shown in Tables 3 and 4, and in FIG. 1A, the thermal decomposition temperatures at 5% weight loss ($T_{d,5\%}$) increased with $M_n$. After functionalization with SAA-M, the PEI oligomers had a lower $T_{d,5\%}$ than the corresponding PEI-DA oligomers. FIG. 1B illustrates the trends based on cation, where $T_{d,5\%}$ of the Group-I PEIs decreased based on M in the sequence of PEI-SAA-Li>PEI-SAA-Na>PEI-SAA-K. Similarly, $T_{d,5\%}$ decreased based on M in the sequence of PEI-SAA-Mg≈PEI-SAA-Ca>PEI-SAA-Sr. Overall, TGA showed that PEI-SAA-M oligomers had excellent thermal stability, having single-step degradation at $T_{d,5\%}$ from 483 to 527° C. The thermal stability of PEI-SAA-M oligomers provides a large temperature window for thermal processing.

Figure 2A:
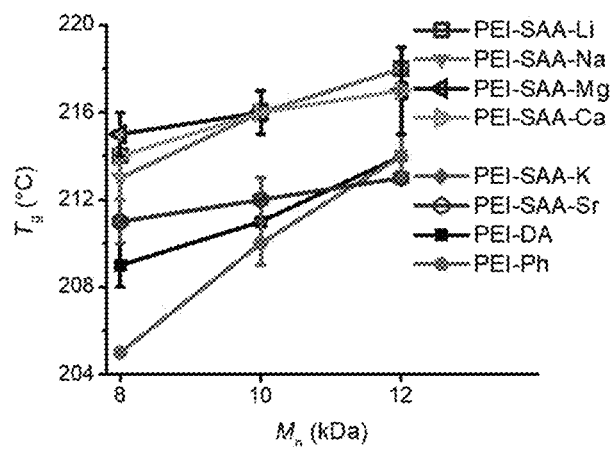
FIG. 2A is a graph of glass transition temperature ($T_g$, ° C.) versus $M_n$ (kDa).
Figure 2B:
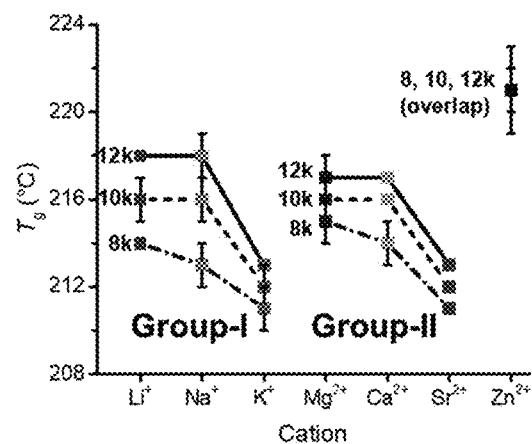
FIG. 2B shows the $T_g$ as a function of cation and $M_n$.

FIG. 2A illustrates how the PEI-SAA-M oligomers exhibited increased $T_g$ values with increased $M_n$, similar to the non-sulfonated analogs, although the magnitude of increase was less than either PEI-DA or PEI-Ph. FIG. 2B illustrates how $T_g$ increased based on increasing $M_n$. The relative increases in $T_g$ for the PEI-SAA-M oligomers were smaller than for the non-metalated analogs.

Film Formability

Figure 3:
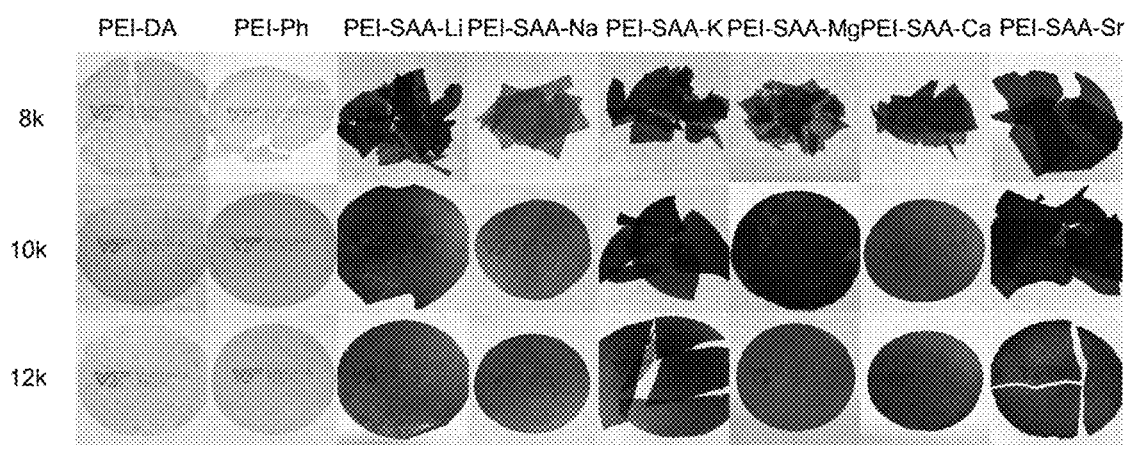
FIG. 3 are photographs of films according to one or more aspects.
Figure 4A:
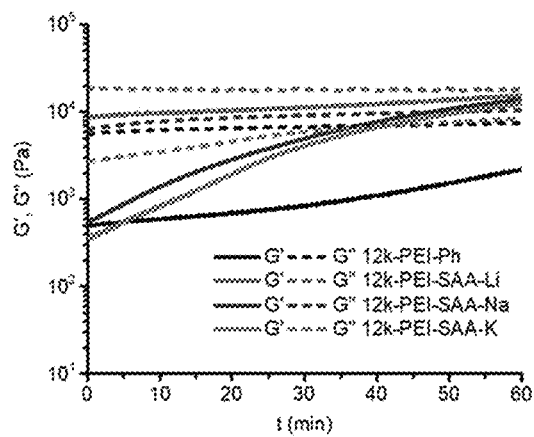
FIGS. 4A and 4B are graphs of storage modulus (G', MPa) and loss modulus (G", MPa) versus time (minutes, min) showing rheological time sweeps.
Figure 4B:
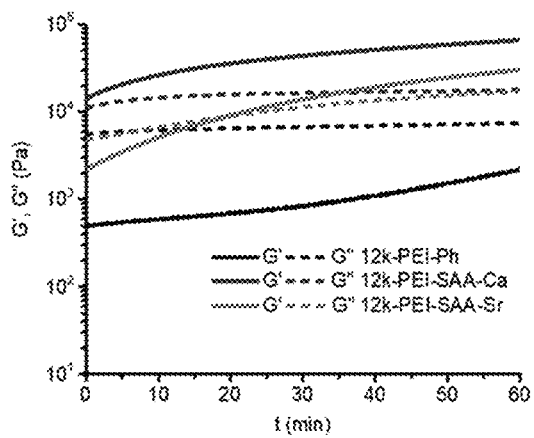
Figure 4C:
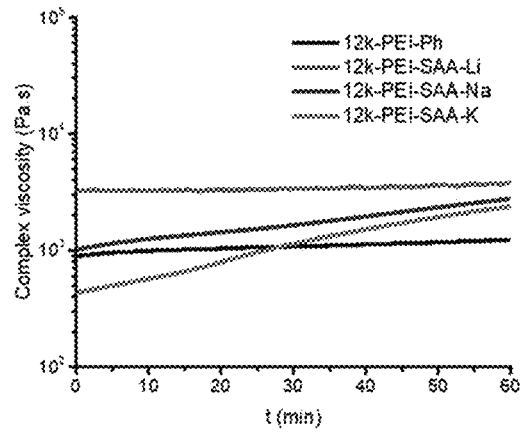
FIGS. 4C and 4D are graphs of complex viscosity ($\eta^*$, Pascal second, Pa·s) versus time (min).
Figure 4D:
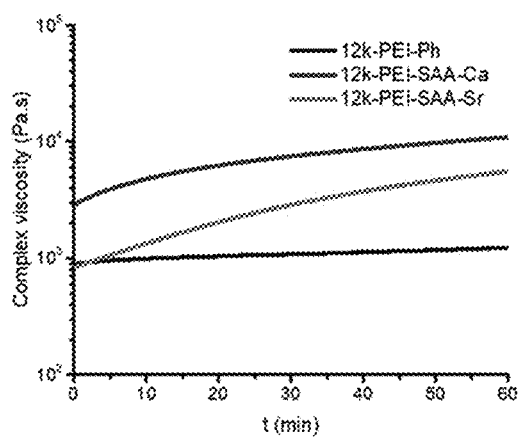

FIG. 3 shows the melt-pressed PEI oligomer films based on end groups and $M_n$. The film formability of PEI-SAA-M oligomers varied based on molecular weight and the cation size. With the exception of PEI-SAA-Zn (not shown), the 8 k-PEI oligomers did not form intact films. With the exception of PEI-SAA-K and PEI-SAA-Sr, the 10 k-PEI oliomgers and 12 k-PEI oligomers formed films.

Thermo-Oxidative Stability

Rheological time sweeps were used to compare the melt stabilities of the 12 k-PEI oligomers with various end groups at 340° C. FIGS. 4A to 4D show time sweeps (1% oscillatory strain, 1 Hz, 340° C., 1 h, under air) for the PEI oligomers with various end groups. Compared to PEI-Ph, the PEI-SAA-M oligomers showed reduced thermo-oxidative stabilities, as shown by the tendency of G' to crossover G" within 60 min. The PEI-Ph, PEI-SAA-Li, and PEI-SAA-Zn (not shown) oligomers had no crossover points. In Group-I PEI oligomers, the thermo-oxidative stability decreased in the sequence of PEI-SAA-Li>PEI-SAA-Na>PEI-SAA-K, with no crossover of G' and G" observed within the first 40 min. The initial complex viscosities decreased in the sequence of PEI-SAA-Li>PEI-SAA-Na>PEI-SAA-K. The initial viscosity of PEI-SAA-K was lower than that of PEI-Ph, similar to the $T_g$ of PEI-SAA-K being lower than that of PEI-Ph. As in the Group-I PEIs, Group-II PEIs exhibited low thermo-oxidative stability at 340° C. G' and G" of PEI-SAA-Ca had already crossed over before the data collection, while those of PEI-SAA-Sr crossed over within 20 min. Similar to PEI-SAA-K, the initial complex viscosity of PEI-SAA-Sr was lower than that of PEI-SAA-Ph. Relative to PEI-Ph, the PEI-SAA-M oligomers showed increased complex viscosity over time, with the exception of PEI-SAA-Li and PEI-SAA-Zn (not shown).

Rheological Properties

Figure 5A:
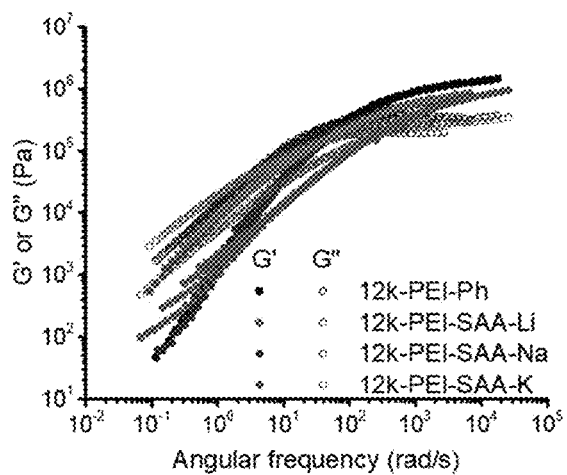
FIG. 5A is a graph of modulus (G' or G", MPa) versus angular frequency (radians per second, rad/s) showing time-temperature superposition (TTS) flow properties.
Figure 5B:
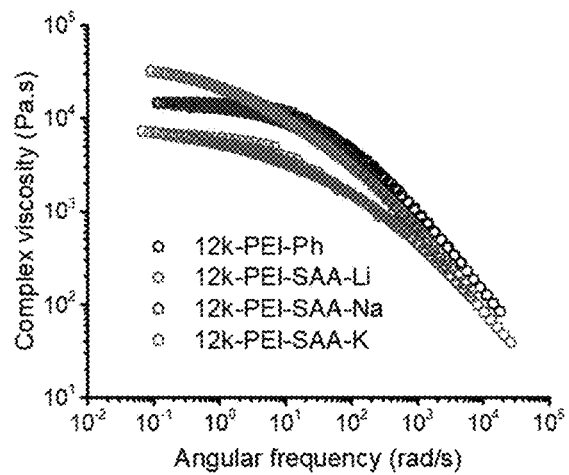
FIG. 5B is a graph of complex viscosity ($\eta^*$, Pa·s) versus temperature (° C.).

The melt rheology of the PEI-SAA-M (M=Li, Na, and K) showed the impact of the alkali metal cations on the flow characteristics of the PEIs. FIG. 5A shows the TTS master curves used to determine the rheological properties at a reference temperature ($T_r$) of 300° C. The G' and G" of 12k-PEI-SAA-Li and 12k-PEI-SAA-Na crossed over at frequencies of 35 and 70 rad/s, both of which were lower than the crossover frequency of 12k-PEI-Ph at 100 rad/s. In contrast, 12k-PEI-SAA-K showed a crossover of G' and G" at 270 rad/s, which was higher than the crossover frequency of 12k-PEI-Ph. The complex viscosity provided in FIG. 5B shows the PEI oligomers exhibited shear thinning behavior. The viscosity of PEI-SAA-K is the lowest among the Group-I PEIs and even lower than that of PEI-Ph, which corresponds well with PEI-SAA-K having the lowest $T_g$. PEI-SAA-Li shows the strongest shear thinning and the lowest viscosity at a typical processing rate of ~1000 rad/s. The viscosities at low frequencies (<1 rad/s) decreased in the sequence of PEI-SAA-Li>PEI-SAA-Na>PEI-SAA-K, in agreement with the trend of the initial viscosities in the time sweep tests shown in FIG. 4C.

This disclosure is further illustrated by the following non-limiting aspects.

Aspect 1. A polyimide oligomer of the formula (1), wherein G is a group having a valence of t, each Q is independently the same or different, and is a substituted or unsubstituted divalent $C_{1-60}$ hydrocarbon group, —O—, —C(O)O—, —OC(O)O—, —S—, —S(O$_3$)—, —OS(O)$_3$—, or —OP(O)$_3$—, each M is independently the same or different, and is a substituted or unsubstituted divalent $C_{1-60}$ hydrocarbon group, —O—, —C(O)—, —OC(O)—, —OC(O)O—, —NHC(O), —(O)CNH—, —S—, —S(O)—, or —S(O)$_2$—, D is a phenylene, each V is independently the same or different, and is a tetravalent $C_{4-40}$ hydrocarbon group, each R is independently the same or different, and is a $C_{1-30}$ divalent bridging group, a $C_{1-20}$ alkylene-X, or a $C_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein each M' is independently Li, Na, K, Cs, Mg, Ca, Sr, Cr, Mn, Fe, Co, Ni, Cu, Zn, Cd, B, Al, Ga, In, Ge, Sn, Pb, As, or Sb, provided that at least one R is $C_{1-20}$ alkylene-X or $C_{6-30}$ arylene-X, q is 0 or 1, m is 0 or 1, d is 0 or 1, p is 1 or 2, t is 1 to 6, and each n is independently the same or different, and is 1 to 1,000, preferably 2 to 500, or 3 to 100, provided that the total of all values of n is greater than 4, or greater than 10, or greater than 20, or greater than 50, or greater than 100, or greater than 250, and wherein the polyimide oligomer is a thermoplastic.

Aspect 2. The polyimide oligomer of aspect 1, wherein t is 1, G is Li, Na, K, Mg, Ca, Sr, or Zn, Q is —O—, —C(O)O—, —OC(O)O—, —S—, —S(O$_3$)—, —OS(O)$_3$—, or —OP(O)$_3$—, and at least one R is a $C_{1-20}$ alkylene-X or a $C_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein each M' is independently Li, Na, K, Mg, Ca, Sr, or Zn; or t is 2, G is Mg, Ca, Sr, or Zn, Q is —O—, —C(O)O—, —OC(O)O—, —S—, —S(O$_3$)—, —OS(O)$_3$—, or —OP(O)$_3$—, and at least one R is a $C_{1-20}$ alkylene-X or a $C_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein M' is Li, Na, K, Mg, Ca, Sr, or Zn; or t is 2, G is —O—, —C(O)—, —OC(O)—, —(O)CO—, —NHC(O), —(O)CNH—, —S—, —S(O)—, —S(O)$_2$—, or —P(R$^a$)(O)— wherein R$^a$ is a $C_{1-8}$ alkyl or $C_{6-12}$ aryl, and at least one R is a $C_{1-20}$ alkylene-X or a $C_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein M' is Li, Na, K, Mg, Ca, Sr, or Zn; or t is greater than 2, G is Cr, Mn, Fe, Co, Ni, Cu, Zn, Cd, B, Al, Ga, In, Sn, Pb, As, Sb, Ti, Zr, Ge, Sn, or a substituted or unsubstituted $C_{1-60}$ hydrocarbon group having a valence of t, G is present in an amount of 0.01 to 20 mol %, preferably 0.5 to 10 mol %, more preferably 1 to 5 mol %, and at least one R is a $C_{1-20}$ alkylene-X or a $C_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein each M' is independently Li, Na, K, Mg, Ca, Sr, or Zn.

Aspect 3. The polyimide oligomer of aspect 1 or 2, wherein the C$_{1-30}$ divalent bridging group of R is the same or different C$_{6-20}$ organic bridging group or a halogenated derivative thereof, a straight or branched chain C$_{2-20}$ alkylene group or a halogenated derivative thereof, or a C$_{3-8}$ cycloalkylene group or halogenated derivative thereof preferably wherein the C$_{1-30}$ divalent bridging group of R is each independently a group of formulas (3) wherein Q$^1$ is —O—, —S—, —C(O)—, —SO$_2$—, —SO—, —P(R$^a$)(=O)— wherein R$^a$ is a C$_{1-8}$ alkyl or C$_{6-12}$ aryl, —C$_y$H$_{2y}$— wherein y is an integer from 1 to 5 or a halogenated derivative thereof.

Aspect 4. The polyimide oligomer of any one or more of the preceding aspects, wherein m is 0, t is 2, Q is —C(O)O— or —S(O$_3$)—, and G is Mg, Ca, Sr, or Zn.

Aspect 5. The polyimide oligomer of any one or more of the preceding aspects, wherein m is 0, t is 2, Q is —C(O)O— or —S(O$_3$)—, G is Mg, Ca, Sr, or Zn, and at least one R is a C$_{1-20}$ alkylene-X or a C$_{6-30}$ arylene-X wherein —X is —C(O)O-M' or —S(O)$_3$-M', and wherein each M' is independently Li, Na, K, Mg, Ca, Sr, or Zn.

Aspect 6. The polyimide oligomer of any one or more of aspects 1 to 3, wherein m is 0, t is 1, Q is —C(O)O— or —S(O$_3$)—, and at least one R is a C$_{1-20}$ alkylene-X or a C$_{6-30}$ arylene-X wherein —X is —C(O)O-M' or —S(O)$_3$-M', and wherein each M' is independently Li, Na, K, Mg, Ca, Sr, or Zn.

Aspect 7. The polyimide oligomer of any one or more of aspects 1 to 3, wherein G is —O—, a substituted or unsubstituted C$_{1-20}$ alkylene, a substituted or unsubstituted C$_{3-8}$ cycloalkylene, a substituted or unsubstituted C$_{6-20}$ arylene, or a substituted or unsubstituted C$_{3-12}$ heteroarylene.

Aspect 8. The polyimide oligomer of any one or more of aspects 1 to 3 or 7, wherein q is 1, Q is a C$_{6-20}$ arylene, m is 1, and M is —O—.

Aspect 9. The polyimide oligomer of any one or more of the preceding aspects, wherein V is a group of formulas (2) wherein W is —O—, —S—, —C(O)—, —SO$_2$—, —SO—, —P(R$^a$)(=O)— wherein R$^a$ is a C$_{1-8}$ alkyl or C$_{6-12}$ aryl, —C$_y$H$_{2y}$— wherein y is an integer from 1 to 5 or a halogenated derivative thereof, or a group of the formula —O—Z—O— wherein Z is an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded.

Aspect 10. The polyimide oligomer of any one or more of the preceding aspects, wherein the polyimide oligomer is a polyetherimide oligomer of formula (1a) wherein each Z is independently an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded.

Aspect 11. The polyimide oligomer of aspect 10, wherein Z is a divalent group of formula (5a) wherein J is —O—, —S—, —SO—, or —C$_y$H$_{2y}$— wherein y is an integer from 1 to 5 or a halogenated derivative thereof, preferably isopropylidene; and each R is the same or different, and is m-phenylene or p-phenylene, bis(4,4'-phenylene)sulfone, bis(3,4'-phenylene)sulfone, bis(3,3'-phenylene)sulfone, a C$_{1-20}$ alkylene-X, or a C$_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', wherein each M' is independently Li, Na, K, Mg, Ca, Sr, or Zn, and at least one R is C$_{1-20}$ alkylene-X or C$_{6-30}$ arylene-X.

Aspect 12. The polyimide oligomer of aspect 11, wherein J is isopropylidene, at least one R is m-phenylene, and at least one R is phenylene-X wherein —X is —S(O)$_3$-M' and each M is independently Li, Na, K, Mg, Ca, Sr, or Zn.

Aspect 13. The polyimide oligomer of any one or more of the preceding aspects, having one or more of: a T$_g$ greater than 160° C., preferably 160 to 395° C., more preferably 180 to 280° C., even more preferably 200 to 250° C.; or a thermal decomposition temperature of greater than 450° C., preferably 480 to 600° C., more preferably 500 to 600° C., as determined at a 5% weight loss by thermogravimetric analysis; or a polydispersity of 1.5 to 3, preferably 1.5 to 2.4, more preferably 1.6 to 2.1, as determined by size exclusion chromatography multi-angle light scattering.

Aspect 14. A method for the manufacture of the polyimide oligomer of any one or more of the preceding aspects, the method comprising reacting a diamine of the formula (7) with a dianhydride of the formula (6) and optionally a polyamine of the formula (8) in a solvent and under conditions effective to provide an anhydride-capped oligomer; and reacting the anhydride-capped oligomer with a metalated amino compound of the formula (9) under conditions effective to provide the polyimide oligomer, wherein R$^1$ is a C$_{1-30}$ divalent bridging group, R$^2$ is a C$_{1-20}$ alkylene-X or a C$_{6-30}$ arylene-X wherein —X, G, Q, M, D, V, q, m, d, p, and t are as defined herein.

Aspect 15. A method for the manufacture of the polyimide oligomer of any one or more of aspects 1 to 13, wherein the polyimide oligomer is a polyetherimide oligomer, the method comprising: reacting a diamine of the formula (7) with an anhydride of the formula (10) and optionally a polyamine of the formula (8) wherein X is a nitro group or halogen, to provide intermediate bis(phthalimide)s of the formulas (11a) and optionally (11b); reacting the bis(phthalimide)s with an alkali metal salt of a dihydroxy aromatic compound of the formula (12) wherein AM is an alkali metal, to provide an anhydride-capped oligomer; and reacting the anhydride-capped oligomer with a metalated amino compound of the formula (9) under conditions effective to provide the polyetherimide oligomer, wherein R$^1$ is a C$_{1-20}$ divalent hydrocarbon group, R$^2$ is a C$_{1-20}$ alkylene-X or a C$_{6-30}$ arylene-X wherein —X, G, Q, M, D, V, q, m, d, p, and t are as defined herein.

Aspect 16. A polymer composition comprising: the polyimide oligomer of any one or more of aspect; and a second polymer different from the polyimide oligomer.

Aspect 17. The polymer composition of aspect 16, wherein the second polymer is a polyacetal, poly(C$_{1-6}$ alkyl)acrylate, polyacrylamide, polyacrylonitrile, polyamide, polyamideimide, polyanhydride, polyarylene ether, polyarylene ether ketone, polyarylene ketone, polyarylene sulfide, polyarylene sulfone, polybenzothiazole, polybenzoxazole, polybenzimidazole, polycarbonate, polyester, polyetherimide, polyimide, poly(C$_{1-6}$ alkyl)methacrylate, polymethacrylamide, cyclic olefin polymer, polyolefin, polyoxadiazole, polyoxymethylene, polyphthalide, polysilazane, polysiloxane, polystyrene, polysulfide, polysulfonamide, polysulfonate, polythioester, polytriazine, polyurea, polyurethane, vinyl polymer, or a combination thereof.

Aspect 18. An article comprising the polyimide oligomer of any one or more of the preceding aspects.

Aspect 18a. The article of aspect 18, wherein the article is a film, a foam, a membrane, a conducting part, a fiber, a lens, a varnish, or a composite; more preferably wherein the article is an open cell foam, a closed cell foam, a nano-foam, a battery separator, an ion exchange membrane, tubing, a capillary, a coating, or a scratch resistant part.

Aspect 19. The article of aspect 18, wherein the article is a foam, preferably a closed cell foam.

Aspect 20. A method for manufacturing the article of any one or more of the preceding aspects, preferably wherein the method comprises melt processing; more preferably melt extrusion, injection molding, thermoforming, roto-molding, additive manufacturing, or a combination thereof.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The singular forms "a," "an," and "the" include plural referents unless the context clearly dictates otherwise. "Combinations" is inclusive of blends, mixtures, alloys, reaction products, and the like. "Or" means "and/or" unless clearly indicated otherwise by context. Reference throughout the specification to "an embodiment" means that a particular element described in connection with the embodiment is included in at least one embodiment described herein, and may or may not be present in other embodiments. The described elements may be combined in any suitable manner in the various embodiments. "Combination thereof" is an open term that includes one or more of the named elements, optionally together with a like element not named.

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group.

As used herein, the term "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylarylene" refers to an aryl group that has been substituted with an alkyl group as defined above, with 4-methylphenyl being an exemplary alkylarylene group; "arylalkylene" refers to an alkyl group that has been substituted with an aryl group as defined above, with benzyl being an exemplary arylalkylene group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl groups; $C_{1-6}$ or $C_{1-3}$ alkoxy; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic ring (e.g., phenyl, biphenyl, naphthyl, or the like, each ring either substituted or unsubstituted aromatic); or $C_{7-19}$ arylalkylene having 1 to 3 separate or fused rings.

Unless specified to the contrary herein, all test standards are the most recent standard in effect as of the filing date of this application, or, if priority is claimed, the filing date of the earliest priority application in which the test standard appears. Unless defined otherwise, technical and scientific terms used herein have the same meaning as is commonly understood by one of skill in the art to which this invention belongs. All cited patents, patent applications, and other references are incorporated herein by reference in their entirety.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:
1. A polyimide oligomer of the formula

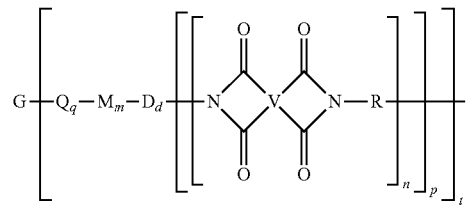

wherein
G is a group having a valence of t,
each Q is independently the same or different, and is a substituted or unsubstituted divalent $C_{1-60}$ hydrocarbon group, —O—, —C(O)O—, —OC(O)O—, —S—, —S(O$_3$)—, —OS(O)$_3$—, or —OP(O)$_3$—,
each M is independently the same or different, and is a substituted or unsubstituted divalent $C_{1-60}$ hydrocarbon group, —O—, —C(O)—, —OC(O)—, —OC(O)O—, —NHC(O)—, —(O)CNH—, —S—, —S(O)—, or —S(O)$_2$—,
D is a phenylene,
each V is independently the same or different, and is a tetravalent $C_{4-40}$ hydrocarbon group, each R is independently the same or different, and is a $C_{1-30}$ divalent bridging group, a $C_{1-20}$ alkylene-X, or a $C_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein each M' is independently Li, Na, K, Cs, Mg, Ca, Sr, Cr, Mn, Fe, Co, Ni, Cu, Zn, Cd, B, Al, Ga, In, Ge, Sn, Pb, As, or Sb, provided that at least one R is $C_{1-20}$ alkylene-X or $C_{6-30}$ arylene-X, q is 0 or 1, m is 0 or 1, d is 0 or 1, p is 1 or 2, t is 1 to 6, and each n is independently the same or different, and is 1 to 1,000, provided that the total of all values of n is greater than 4, and wherein the polyimide oligomer is a thermoplastic.

2. The polyimide oligomer of claim 1, wherein
t is 1, G is Li, Na, K, Mg, Ca, Sr, or Zn, Q is —O—, —C(O)O—, —OC(O)O—, —S—, —S(O$_3$)—, —OS(O)$_3$—, or —OP(O)$_3$—, and at least one R is a $C_{1-20}$ alkylene-X or a $C_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein each M' is independently Li, Na, K, Mg, Ca, Sr, or Zn; or t is 2, G is Mg, Ca, Sr, or Zn, Q is —O—, —C(O)O—, —OC(O)O—, —S—, —S(O$_3$)—, —OS(O)$_3$—, or —OP(O)$_3$—, and at least one R is a $C_{1-20}$ alkylene-X or a $C_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein M' is Li, Na, K, Mg, Ca, Sr, or Zn; or t is 2, G is —O—, —C(O)—, —OC(O)—, —(O)CO—, —NHC(O)—, —(O)CNH—, —S—, —S(O)—, —S(O)$_2$—, or —P(R$^a$)(O)— wherein R$^a$ is a $C_{1-8}$ alkyl or $C_{6-12}$ aryl, and at least one R is a $C_{1-20}$ alkylene-X or a $C_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein M' is Li, Na, K, Mg, Ca, Sr, or Zn; or t is greater than 2, G is Cr, Mn, Fe, Co, Ni, Cu, Zn, Cd, B, Al, Ga, In, Sn, Pb, As, Sb, Ti, Zr, Ge, Sn, or a substituted or unsubstituted $C_{1-60}$ hydrocarbon group having a valence of t, G is present in an amount of 0.01 to 20 mol %, and at least one R is a $C_{1-20}$ alkylene-X or a $C_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', and wherein each M' is independently Li, Na, K, Mg, Ca, Sr, or Zn.

3. The polyimide oligomer of claim 1, wherein the $C_{1-30}$ divalent bridging group of R is the same or different $C_{6-20}$ organic bridging group or a halogenated derivative thereof, a straight or branched chain $C_{2-20}$ alkylene group or a halogenated derivative thereof, or a $C_{3-8}$ cycloalkylene group or halogenated derivative thereof.

4. The polyimide oligomer of claim 1, wherein m is 0, t is 2, Q is —C(O)O— or —S(O$_3$)—, and G is Mg, Ca, Sr, or Zn.

5. The polyimide oligomer of claim 1, wherein m is 0, t is 2, Q is —C(O)O— or —S(O$_3$)—, G is Mg, Ca, Sr, or Zn, and at least one R is a $C_{1-20}$ alkylene-X or a $C_{6-30}$ arylene-X wherein —X is —C(O)O-M' or —S(O)$_3$-M', and wherein each M' is independently Li, Na, K, Mg, Ca, Sr, or Zn.

6. The polyimide oligomer of claim 1, wherein m is 0, t is 1, Q is —C(O)O— or —S(O$_3$)—, and at least one R is a $C_{1-20}$ alkylene-X or a $C_{6-30}$ arylene-X wherein —X is —C(O)O-M' or —S(O)$_3$-M', and wherein each M' is independently Li, Na, K, Mg, Ca, Sr, or Zn.

7. The polyimide oligomer of claim 1, wherein G is —O—, a substituted or unsubstituted $C_{1-20}$ alkylene, a substituted or unsubstituted $C_{3-8}$ cycloalkylene, a substituted or unsubstituted $C_{6-20}$ arylene, or a substituted or unsubstituted $C_{3-12}$ heteroarylene.

8. The polyimide oligomer of claim 1, wherein q is 1, Q is a $C_{6-20}$ arylene, m is 1, and M is —O—.

9. The polyimide oligomer of claim 1, wherein V is a group of the formula

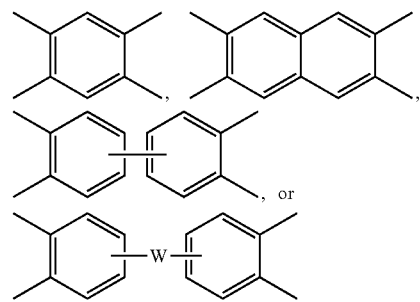

wherein W is —O—, —S—, —C(O)—, —SO$_2$—, —SO—, —P(R$^a$)(=)— wherein R$^a$ is a $C_{1-8}$ alkyl or $C_{6-12}$ aryl, —C$_y$H$_{2y}$— wherein y is an integer from 1 to 5 or a halogenated derivative thereof, or a group of the formula —O—Z—O— wherein Z is an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded.

10. The polyimide oligomer of claim 1, wherein the polyimide oligomer is a polyetherimide oligomer of the formula

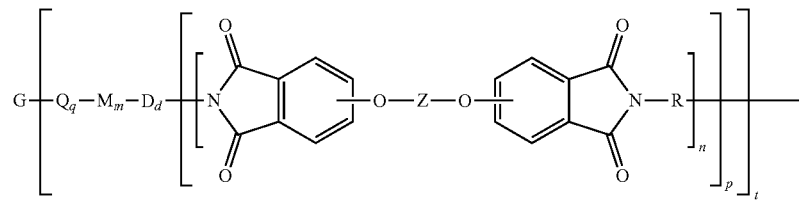

wherein each Z is independently an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded.

11. The polyimide oligomer of claim 10, wherein Z is a divalent group of the formula

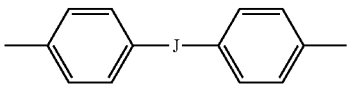

wherein

J is —O—, —S—, —C(O)—, —SO$_2$—, —SO—, or —C$_y$H$_{2y}$— wherein y is an integer from 1 to 5 or a halogenated derivative thereof; and each R is the same or different, and is m-phenylene or p-phenylene, bis(4,4'-phenylene)sulfone, bis(3,4'-phenylene)sulfone, bis(3,3'-phenylene)sulfone, a C$_{1-20}$ alkylene-X, or a C$_{6-30}$ arylene-X wherein —X is —O-M', —C(O)O-M', —OC(O)O-M', —S-M', —S(O)$_2$-M', —S(O)$_3$-M', —OS(O)$_3$-M', or —OP(O)$_3$-M', wherein each M' is independently Li, Na, K, Mg, Ca, Sr, or Zn, and at least one R is C$_{1-20}$ alkylene-X or C$_{6-30}$ arylene-X.

12. The polyimide oligomer of claim 11, wherein J is isopropylidene, at least one R is m-phenylene, and at least one R is phenylene-X wherein —X is —S(O)$_3$-M' and each M is independently Li, Na, K, Mg, Ca, Sr, or Zn.

13. The polyimide oligomer of claim 1, having one or more of:
a T$_g$ greater than 160° C., or
a thermal decomposition temperature of greater than 450° C., as determined at a 5% weight loss by thermogravimetric analysis; or
a polydispersity of 1.5 to 3, as determined by size exclusion chromatography multi-angle light scattering.

14. A method for the manufacture of the polyimide oligomer of claim 1, the method comprising reacting
a diamine of the formula

H$_2$N—R$^1$—NH$_2$ with a dianhydride of the formula

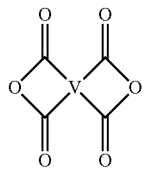

and optionally a polyamine of the formula

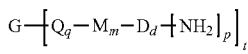

in a solvent and under conditions effective to provide an anhydride-capped oligomer; and
reacting the anhydride-capped oligomer with a metalated amino compound of the formula

HN—R$^2$ under conditions effective to provide the polyimide oligomer, wherein R$^1$ is a C$_{1-30}$ divalent bridging group, R$^2$ is a C$_{1-20}$ alkylene-X or a C$_{6-30}$ arylene-X.

15. A method for the manufacture of the polyimide oligomer of claim 1, wherein the polyimide oligomer is a polyetherimide oligomer, the method comprising:

reacting
a diamine of the formula

H$_2$N—R$^1$—NH$_2$ with an anhydride of the formula

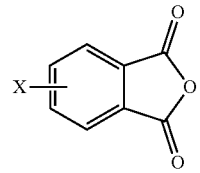

and optionally a polyamine of the formula

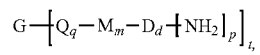

wherein X is a nitro group or halogen, to provide intermediate bis(phthalimide)s of the formulas

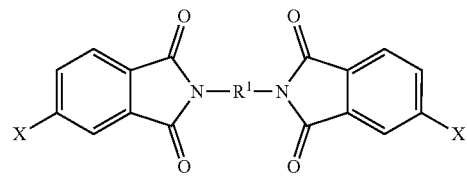

and optionally

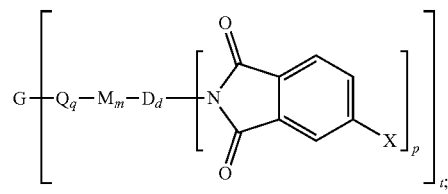

reacting the bis(phthalimide)s with an alkali metal salt of a dihydroxy aromatic compound of the formula

AMO—Z—OAM wherein AM is an alkali metal, to provide an anhydride-capped oligomer; and
reacting the anhydride-capped oligomer with a metalated amino compound of the formula

H$_2$N—R$^2$ under conditions effective to provide the polyetherimide oligomer, wherein R$^1$ is a C$_{1-20}$ divalent hydrocarbon group, R$^2$ is a C$_{1-20}$ alkylene-X or a C$_{6-30}$ arylene-X.

16. A polymer composition comprising:
the polyimide oligomer of claim 1; and
a second polymer different from the polyimide oligomer.

17. The polymer composition of claim 16, wherein the second polymer is a polyacetal, poly(C$_{1-6}$ alkyl)acrylate, polyacrylamide, polyacrylonitrile, polyamide, polyamideimide, polyanhydride, polyarylene ether, polyarylene ether ketone, polyarylene ketone, polyarylene sulfide, polyarylene sulfone, polybenzothiazole, polybenzoxazole, polybenzimidazole, polycarbonate, polyester, polyetherimide, polyimide, poly($C_{1-6}$ alkyl)methacrylate, polymethacrylamide, cyclic olefin polymer, polyolefin, polyoxadiazole, polyoxymethylene, polyphthalide, polysilazane, polysiloxane, polystyrene, polysulfide, polysulfonamide, polysulfonate, polythioester, polytriazine, polyurea, polyurethane, vinyl polymer, or a combination thereof.

18. An article comprising the polyimide oligomer of claim 1.

19. The article of claim 18, wherein the article is a film, a foam, a membrane, a conducting part, a fiber, a lens, a varnish, or a composite.

20. A method for manufacturing the article of claim 18, wherein the method comprises melt processing, solvent casting, additive manufacturing, or a combination thereof.

* * * * *